(12) United States Patent
Parriaux

(10) Patent No.: US 7,454,103 B2
(45) Date of Patent: Nov. 18, 2008

(54) HIGH EFFICIENCY OPTICAL DIFFRACTION DEVICE

(76) Inventor: Olivier M. Parriaux, 12, rue Gambetta, 42100 Saint-Etienne (FR)

( * ) Notice: Subject to any disclaimer, the term of this patent is extended or adjusted under 35 U.S.C. 154(b) by 0 days.

(21) Appl. No.: 11/568,135

(22) PCT Filed: Apr. 22, 2005

(86) PCT No.: PCT/EP2005/004357

§ 371 (c)(1), (2), (4) Date: Aug. 16, 2007

(87) PCT Pub. No.: WO2005/103771

PCT Pub. Date: Nov. 3, 2005

(65) Prior Publication Data

US 2008/0138013 A1    Jun. 12, 2008

(30) Foreign Application Priority Data

Apr. 23, 2004 (EP) .................. 04009672
Jul. 30, 2004 (WO) .............. PCT/EP2004/008583

(51) Int. Cl.
*G02B 6/34* (2006.01)
*G02B 27/44* (2006.01)

(52) U.S. Cl. ........................ 385/37; 359/369
(58) Field of Classification Search .................. 385/37; 359/369
See application file for complete search history.

(56) References Cited

U.S. PATENT DOCUMENTS 4,905,252 A    2/1990  Goldberg et al.
5,553,088 A    9/1996  Brauch et al.
5,970,190 A   10/1999  Fu et al.
6,049,588 A    4/2000  Cash, Jr.
6,215,928 B1   4/2001  Friesem et al.
6,219,478 B1   4/2001  Parriaux et al.

OTHER PUBLICATIONS

Sychugov, V A et al., "Autocollimation diffractions gratings based on waveguides with leakage modes," Quantum Electronics 30, 2000, pp. 1094-1098.

Krawczak, John et al., "Diffraction efficiency gain, blazing, and apodizing of a symmetric square reflection grating in an etalon," Optics Letters, Nov. 15, 1990, pp. 1264-1266.

(Continued)

Primary Examiner—M. R. Connelly-Cushwa
Assistant Examiner—Jerry T Rahll
(74) Attorney, Agent, or Firm—Griffin & Szipl, P.C.

(57) ABSTRACT

Lightwave diffraction device formed of a dielectric layer (4), a mirror (12) arranged at the lower face (10) of said layer, a semi-reflective structure (13) arranged at the upper face (100) of said layer, and a diffractive structure (8) arranged in said layer or on its faces. The height (H) of the layer is chosen so as to substantially satisfy the resonance condition for at least one leaky mode propagating in said layer for at least one given incident wave having a determined wavelength $\lambda$ and a determined incidence angle $\theta_c$. Next, the diffractive structure is arranged so that there is no propagating positive diffracted order, and so that all negative orders other than the $-1^{st}$ propagating order have zero or a relatively small diffraction efficiency, the reflected $-1^{st}$ order propagating in a direction non-parallel to the incident wave. This diffraction device allows a high diffraction efficiency of up to 100% for the $-1^{st}$ order.

41 Claims, 11 Drawing Sheets

OTHER PUBLICATIONS

International Search Report issued in corresponding application No. PCT/EP2005/004357, completed Jul. 11, 2005 and mailed Jul. 26, 2005.

Perry, M.D. et al., "High-efficiency multilayer dielectric diffraction gratings," Optics Letters, vol. 20, No. 8, Apr. 15, 1995, pp. 940-942.

Wei, Hongobo et al., "All-dielectric reflection gratings: a study of the physical mechanism for achieving high efficiency," Applied Optics, vol. 42, No. 31, Nov. 1, 1993, pp. 6255-6260.

M. Svalgaard, "Optical waveguides and gratings made by UV-photogeneration", Proceedings of the European Conference on Integrated Optics ECIO'99, Turin, Italy, Apr. 1999, pp. 333-338.

J.-D. Decotignie, O. Parriaux, F.E. Gardiol, "Wave propagation in lossy and leaky planar optical waveguides", AEÜ, Band 35, 1981, pp. 201-204.

I.A. Avrutsky, A.S. Svakhin, V.A. Sychuygov and O. Parriaux, "High-efficiency single-order waveguide grating coupler", Optics Letters, vol. 15, pp. 1446-1448, 1990.

G.A. Golubenko, A.S. Svakhin, V.A. Sychugov, and A.V. Tishchenko, "Total reflection of light from a corrugated surface of a dielectric waveguide", Soviet Journal of Quantum Electronics, vol. 15, 1985, p. 886-887.

N. Matuschek, F.X. Kärtner, U. Keller, "Theory of double-chirped mirrors", IEEE J. Selected Topics in Quantum Electronics, vol. 4, pp. 197-208, 1998.

J.-M. Verdiell, R. Frey, "A broad-area mode-coupling model for multiple-stripe semiconductor lasers", IEEE J. Quantum Electronics, vol. 26, 1990, pp. 270-279.

V. Raab, R. Menzel, "External resonator design for high-power laser diodes that yields 400 mW of TEM00 power", Optics Letters vol. 27, 2002, pp. 167-169.

McLeod, John H., "The Axicon: A New Type of Optical Element," Journal of The Optical Society of America, vol. 44, No. 8, Aug. 1954, pp. 592-597.

J.H. McLeod, J. Opt. Soc. Am., vol. 44, p. 592, 1954, and as reviewed by Z. Jaroszewicz, A. Burvall, A.T. Friberg, "Axicon—the most important optical element", Optics & Photonics News, Apr. 2005, pp. 34-39.

E. Noponen, J. Turunen, "Binary high-frequency-carrier diffractive optical elements: electromagnetic theory", J. Opt. Soc. Am, A11, 1994, pp. 1097-1109.

T. Okumura, T. Ishikawa, A. Tagaye, K. Koike, "Optical design of liquid crystal display backlighting with highly scattering optical transmission polymers", J. Opt. A: Pure and Appl. Opt., vol. 5, 2003, pp. 5269-5275.

J. Jahns, "Planar Integrated Free-space Optics", Chapter 7, pp. 178-198 of Micro-Optics, Ed. H.P. Herzig, Taylor & Francis, 1997 ISBN 0-7484-0481-3.

T. Shiono, H. Ogawa, "Planar-optic-disk pick up with diffractive micro-optics", Appl. Opt., vol. 33, 1994, pp. 7350-7355.

S.J. Walker, J. Jahns, "Optical clock distribution using integrated free-space optics", Optics Communications, vol. 90, 1992, pp. 359-371.

L. Domash, G. Crawford, A. Ashmead, R. Smith, M. Popovich, J. Storey, "Holographic PDLC for photonic applications", Proc. SPIE, vol. 4107, 2000, pp. 1-13.

A. Rodriguez, G. Vitrant, P.A. Chollet, F. Kajzar, "Optical control of an integrated interferometer using a photochromic polymer", Appl. Phys. Lett., vol. 79, 2001, pp. 461-463.

H.Kück et al "Deformable micromirror device as phase-modulating high-resolution light valves", Sensors & Actuators A54, 1996, pp. 536-541.

H. Finkelmann, E. Nishikawa, G. Pereira, "A new opto-mechanical effect in solids", Phys. Rev. Lett., 8701:(1) 5501-U74, 2001.

J.-Y. Chang, C.-M. Wang, C.-C. Lee, H.-F. Shih, M.-L. Wu, "Realization of free-space optical pickup head with stacked Si-based phase elements", IEEE Photonics Tech. Lett., vol. 17, 2005, pp. 214-216.

A. Larsson, N. Eriksson, S. Kristjansson, P. Modh, M. Uemukai, T. Suhara, H. Nishihara, "Grating coupled surface emitters : integrated lasers, amplifiers and beam shaping outcouplers", Proc. SPIE 3626, 1999, pp. 190-201.

Dongwoo Suh, Youngwoo Park, Yeungjoon Sohn, Hesuk Jung, Mun Cheol Paek, Kwangyong Kang, "Optimization of leaky mode directional coupler for the application to a small form factor disk pickup", OWTNM'05, Apr. 7-9, 2005, Paper FrB2-5, Grenoble, France.

T. Fujii, Y.Gao, R. Sharma, E.L. Hu, S.P. DenBaars, S. Nakamura, Increase in the extraction efficiency of GaN-based light-emitting diodes via surface roughening, Appl. Phys. Lett, 84, 855-857 (2004).

Y.R. Do, Y.C. Kim, Y.-W. Song, C.-O Cho, H. Jeon, Y.-J. Lee, S.-H. Kim, Y.-H. Lee, "Enhanced light extraction from organic light emitting diodes with 2D SiO2/SiNx Photonic crystals", Adv. Mater., 15, pp. 1214-1218, Jul. 2003.

L.H. Smith, J.A.E. Wasey, W.L. Barnes, "The light out-coupling efficiency of top emitting organic light-emitting diodes", Appl. Phys. Lett., 84, 2986-2988 (2004).

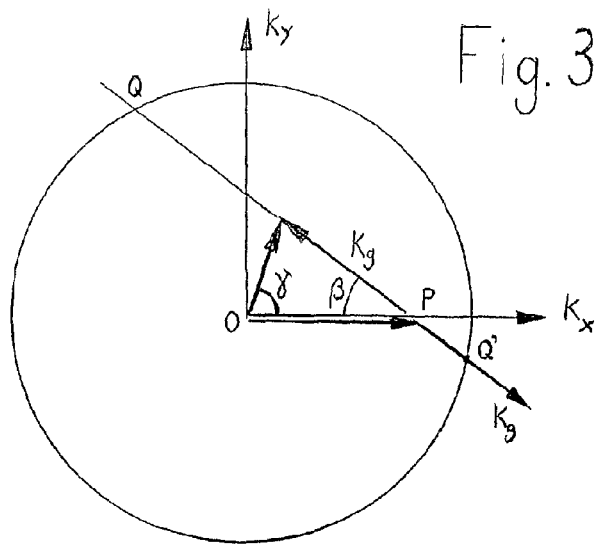
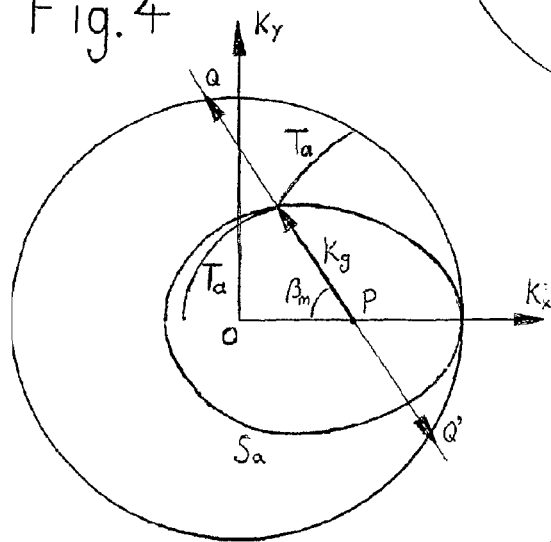
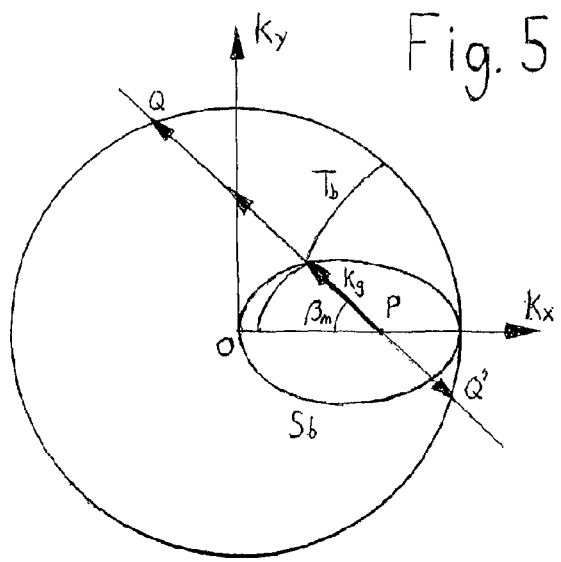

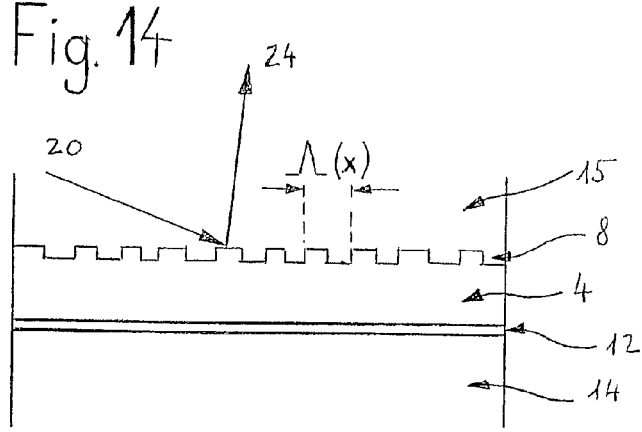
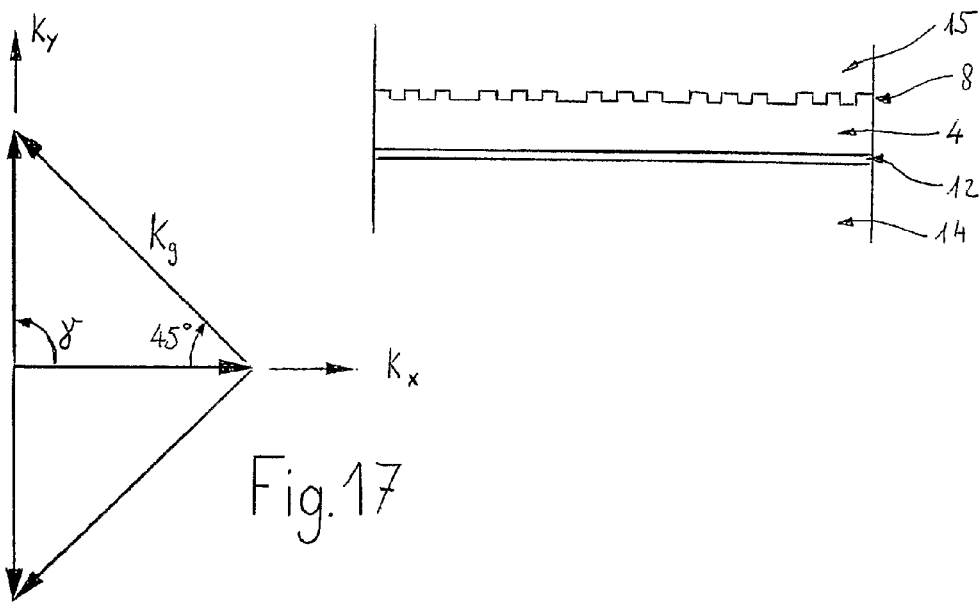
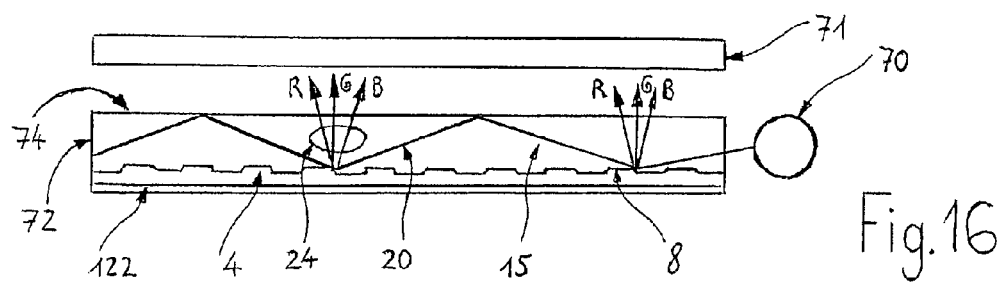

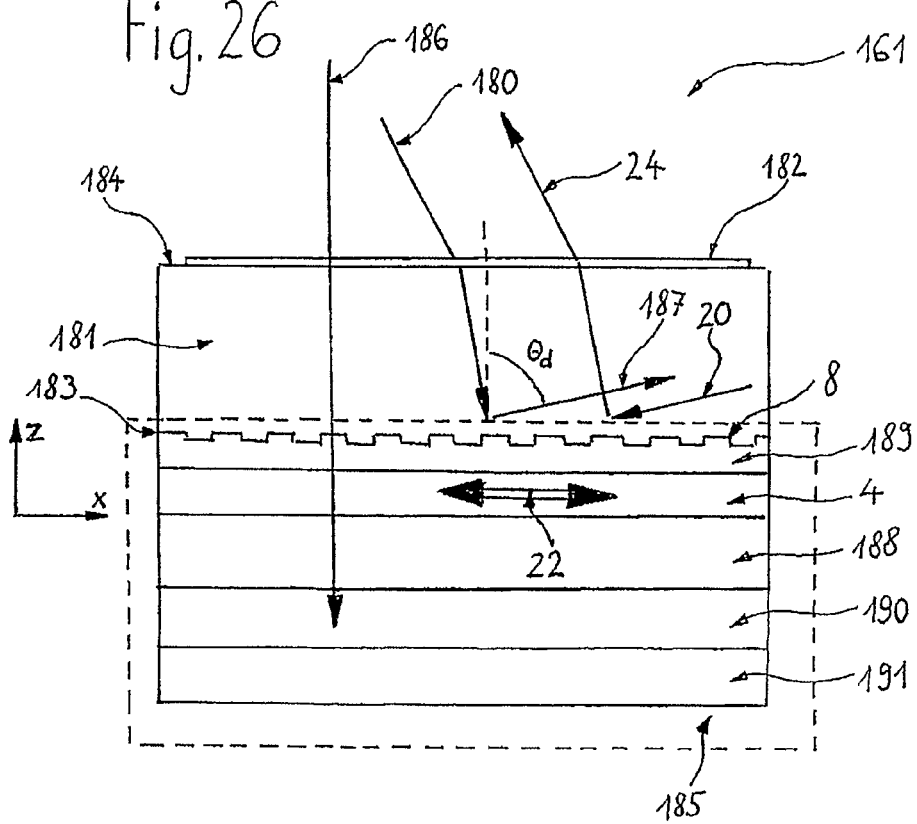

HIGH EFFICIENCY OPTICAL DIFFRACTION DEVICE

This is a National Phase Application in the United States of International Patent Application No. PCT/EP2005/004357 filed Apr. 22, 2005, which claims priority on European Patent Application No. 04009672.9, filed Apr. 23, 2004, and International Patent Application No. PCT/EP2004/008583, filed Jul. 30, 2004. The entire disclosures of the above patent applications are hereby incorporated by reference.

FIELD OF THE INVENTION

The present invention concerns Diffractive Optical Elements and in particular an optical diffraction device of large diffraction efficiency for the sole $-1^{st}$ propagating diffraction order and particularly easy to manufacture, such device having a layer in which light can propagate in a leaky mode, this layer being associated with a diffraction structure and being bounded at a lower side by a highly reflective structure.

BACKGROUND OF THE INVENTION

Diffractive Optical Elements (DOEs) are now widely used in technical optics because they are planar elements which can easily be mounted, packaged, because they can be made by means of high productivity batch planar technologies, and also because they can perform complex optical functions which refractive light processing techniques can not, or can hardly achieve by simple and low cost means.

One of the hurdles in diffractive optics technologies is the difficulty of obtaining high diffraction efficiency. One of the widely used solutions is to decompose the desired analogue groove profile in a number of discrete levels in a staircase form. This is a costly multilevel manufacturing process which is presently limited to elements of small angular aperture. Another solution is to rely upon a gray scale process technology capable of photolithographically and physically transferring the desired analogue profile with fidelity in one single technological step. This solution is not available yet as a manufacturing technology. Yet another solution is to replicate the mould of an analogue surface relief generated by means of highly resolving writing means such as an electron beam pattern generator. This technology is only suitable for manufacturing large volumes of identical elements and suffers from the thermal instability and ageing of the replicable material.

There is therefore the need for a technical solution providing high diffraction efficiency gratings, diffractive optical elements, holograms, even in the presence of more than one propagating diffraction order without having to resort to a multilevel technology to generate analogue groove profiles.

An optical diffraction device is described in U.S. Pat. No. 6,219,478 B1 which discloses a reflective diffraction grating where the diffraction event provides large, possibly 100% diffraction efficiency for the sole $-1^{st}$ propagating diffraction orders in the incidence medium in a direction which is not parallel to the incident wave. This document U.S. Pat. No. 6,219,478 B1 discloses the conditions for the incident beam field to accumulate into a leaky mode of a layer placed on top of the mirror. A leaky mode is a transverse field resonance leaking into the cover medium. A diffraction grating written on, or within the layer acts as a tap regulating the rate of field accumulation so that the accumulated field leaking into the incident medium damps or cancels out the reflection in the direction of the Fresnel reflection by destructive interference between the wave directly reflected from the top surface of the layer and the leaking wave which is accumulated in the leaky mode. Consequently, and provided the incidence configuration is not autocollimation, the optical energy has nowhere else to propagate but to be directed along the $-1^{st}$ diffraction order of the grating.

Although U.S. Pat. No. 6,219,478 B1 discloses the means to possibly achieve up to 100% diffraction efficiency in a grating even when the incidence angle $\theta_c$ (the incidence angle $\theta_c$ is defined from the normal to the general plane in which the grating extends) is relatively small, there are structures where the refractive index difference between the leaky mode propagating layer and the cover medium is too small, and/or there are incidence configurations where the incidence angle is too small, to provide sufficient field accumulation in the leaky mode to permit the cancellation of the reflection, therefore to give rise to 100% diffraction efficiency. In cases where the reflection can nevertheless be cancelled, deep grooves are required which implies that the leaky mode resonance is spectrally and angularly broad. According to U.S. Pat. No. 6,219,478 B1, it is under substantially grazing incidence and/or in the presence of a large index contrast between the leaky mode propagating layer and the cover medium that the reflection coefficient of the top boundary of the dielectric layer is large, i.e., that close to 100% diffraction efficiency can be achieved.

It would therefore be advantageous to achieve the cancellation of the reflection on the leaky mode propagating layer in all cases where the incident or the diffracted beam angle is small and in cases where the refractive index contrast between leaky mode propagating layer and cover is small (as for instance in the case of holograms and most visual diffractive structures which are often coated by a protective layer; when such a coating is applied on top of the leaky mode propagating layer, it is even impossible to obtain large incidence angle at the top surface of this layer since it would correspond to total reflection at the air-coating interface), and to achieve high, possibly 100% $-1^{st}$ order diffraction efficiency by means of a relatively weak corrugation or index modulation (besides, it is not always desired or possible to fabricate a deep corrugation or to cause a large index modulation in the layer propagating the leaky mode).

The documents of the scientific literature dealing with high diffraction efficiency of the $-1^{st}$ order of a reflection grating usually consider the diffraction configuration of the $-1^{st}$ order Littrow incidence where the diffracted beam is diffracted back in the direction of the incident beam. The Littrow incidence condition for the $-1^{st}$ order at vacuum wavelength $\lambda$ from an incidence medium of refractive index $n_c$ on a periodic grating of period $\Lambda$ is characterized by the Littrow angle $\theta_L$ such that $\sin(\theta_L)=\lambda/(2\Lambda n_c)$. This incidence condition is also currently called the autocollimation configuration since the reflected $-1^{st}$ order diffracted wave propagates back parallel to the incident wave. The off-Littrow incidence configuration will hereafter refer to configurations where the angle of incidence $\theta_c$ essentially differs from $\theta_L$, i.e., where the $-1^{st}$ order reflected diffracted wave is not parallel to the incident wave. Apart from a major functional difference, there is a fundamental difference between the autocollimation diffraction configuration and the off-Littrow configuration. Unlike in the off-Littrow diffraction configuration, the autocollimation configuration is known to always permit 100% diffraction efficiency (provided the layer average thickness is larger than a minimum thickness and provided the sole $0^{th}$ and $-1^{st}$ orders can propagate) as calculated for instance in the case of high efficiency femtosecond pulse compression gratings in document M. D. Perry, R. D. Boyd, J. A. Britten, D. Decker, B. W. Shore, C. Shannon, E. Shults, "High-efficiency multilayer dielectric diffraction gratings", Opt. Lett. 20 No 8, 940-942 (1995) and as analyzed by document H. Wei, L. Li, "All-dielectric reflection gratings: a study of the physical mechanism for achieving high efficiency", Appl. Opt., Vol. 42 No 31, 6255-6260 (2003) which explains the mechanism of high efficiency and limits itself to the Littrow case. So does the document by V. A. Sychugov, B. A. Usievich, K. E. Zinov'ev, O. Parriaux, "Autocollimation diffraction gratings based on waveguides with leakage mode", Quantum Electronics, 30(12) 1094-1098 (2000) which reports on the use of a semi-reflective structure on top of a dielectric layer with the objective of obtaining the achievable 100% diffraction efficiency in the $-1^{st}$ order Littrow configuration by means of a grating of a smaller corrugation depth. The semi-reflective structure consists of quarter wave layers at the wavelength, and at the incidence and diffraction direction of the autocollimation configuration.

The reason for such specific feature of the Littrow configuration is that the field of the diffracted wave in the mirrored corrugated structure is the same as that of the incident wave. For instance, the mirror ensuring the reflection of the incident wave reflects the diffracted wave identically. Similarly, in the structure dealt with by the above mentioned paper by V. A. Sychugov et al, the semi-reflective structure ensuring some degree of field concentration in the leaky mode inherently ensures the same degree of field concentration for the diffracted leaky mode. The autocollimation configuration is analogous to the reflection from a quarter wave multilayer mirror or from a fibre Bragg grating mirror with the specificity that the two waves participating in the $-1^{st}$ order reflection (the $-1^{st}$ order directed into the cover and the $-1^{st}$ order directed to the mirror, then reflected into the cover) have to interfere essentially constructively.

Because its symmetry, the autocollimation configuration implies first order coupling between the two counterpropagating leaky modes if the leaky mode propagation condition is satisfied. It is to be noted that the autocollimation configuration permits to obtain 100% diffraction efficiency even if the leaky mode propagation condition is not satisfied.

It is an object of the invention to provide an optical diffraction device having high and possibly 100% diffraction efficiency for the $-1^{st}$ diffraction order in a diffraction configuration where neither the incident beam nor the diffracted beam are grazing, where the diffracted beam is not parallel to the incident beam (i.e., outside the Littrow configuration), by means of a diffractive element or structure having relatively shallow depth or/and weak index modulation.

SUMMARY OF THE INVENTION

Thus, the present invention concerns an optical diffraction device comprising:

a layer defining a general plane and arranged for propagating locally at least one local leaky mode which is excited by refraction of a locally incident electromagnetic wave having a given vacuum wavelength $\lambda$ and reaching said layer from a cover medium of refractive index $n_c$ under a local incidence angle $\theta_c$ relative to the normal to the general plane, said layer having a local mean thickness H and a local refractive index profile $n_f(z)$ substantially satisfying the resonance condition for said at least one local leaky mode;

a highly reflective structure at the lower face of said layer for said at least one local leaky mode;

a diffractive element in the form of a corrugation or/and of an index modulation arranged in, or/and at the upper side of, or/and above, or/and at the lower side of, or/and under said layer for diffracting said locally incident electromagnetic wave into the reflected $-1^{st}$ order in a direction non-parallel to the direction of this locally incident electromagnetic wave;

the locally incident electromagnetic wave reaching said layer with a local incidence direction defining together with the normal to the general plane a local incidence plane, the diffractive element having a local grating vector $K_g$ making an angle $\beta$ with the local incidence plane which is larger than or equal to zero and smaller than or equal to 90 degrees, the diffractive element having, where said locally incident electromagnetic wave reaches said layer, no positive propagating diffraction order and all negative propagating orders with substantially zero diffraction efficiency except the $-1^{st}$ order when said angle $\beta$ is smaller than 90 degrees and all propagating diffraction orders except the two first diffraction orders with substantially zero diffraction efficiency when said angle $\beta$ is equal to 90 degrees, wherein the diffraction device comprises a semi-reflective structure for said locally incident electromagnetic wave which is arranged between the upper side of said layer and said cover medium.

Thanks to the semi-reflective structure, a large field accumulation can be achieved in the leaky mode of the layer under a non-grazing incidence, respectively non grazing diffraction direction for the $-1^{st}$ propagating diffraction order. The presence of the semi-reflective structure of the invention above the layer allows a shallow surface corrugation or a weak index modulation to give rise to close to 100% diffraction efficiency for the $-1^{st}$ diffraction order (up to 100% theoretically) when the non-parallel incident and diffracted beams are not grazing and even when the number of negative propagation orders is larger or much larger than 1. The semi-reflective structure is provided for increasing the reflection coefficient between the layer and the cover medium when the incident beam or diffracted beam is not grazing, allowing a large leaky mode field to take place in the layer and to have a spectrally and angularly sharp resonance under the given conditions for the layer. Thus close to 100% diffraction efficiency can be achieved by a shallow grating corrugation or by a weak refractive index modulation for an incidence angle of the incident beam, or wave, up to close to zero degree, i.e. close to the normal to the general plane of the layer. Through an appropriate choice of the semi-reflective structure, the reflection coefficient at the upper side of the layer, for an incident beam having determined incidence angle and vacuum wavelength, can be selected for optimising the optical diffraction device of the invention.

It is to be noted that the diffractive element can be arranged in or/and at the upper side of the semi-reflective structure.

The device of the invention allows high and possibly close to 100% diffraction efficiency in a non-coplanar diffraction configuration as the excitation of a leaky mode propagating in a direction contained in the incidence plane and having the same polarization as the incident beam suffices to cancel the Fresnel reflection, therefore to give rise to close to 100% diffraction efficiency, essentially regardless of the polarization state of the $-1^{st}$ diffracted order.

Major advantages of the optical diffraction device of the invention are:

The achievement of sharp resonant diffraction at non-grazing incidence;

The achievement of polarization independent leaky mode resonances;

The device according to the present invention gives rise to Diffractive Optical Elements (DOEs), in particular holograms, performing complex optical functions with unusually large efficiency by means of a shallow, possibly binary diffractive structure;

A wider choice of opto-geometrical configurations because of the availability of a third dimension outside the plane of incidence, in particular there can be two crossed gratings;

The device of the invention allows the use of total internal reflection for both the incidence and $-1^{st}$ diffracted waves, therefore a great fabrication simplicity and particularly low losses;

Gratings of period larger and much larger than the wavelength can exhibit high, and close to 100% diffraction efficiency for the sole $-1^{st}$ order despite the possible propagation of other negative orders.

For those familiar to the art, long period gratings are usually associated with small diffraction efficiency unless measures are taken to privilege one diffraction order against other orders by some kind of blazing which is a difficult technology. The consequences of conferring high, possibly 100% efficiency to a single order of a grating of large period and having an ordinary, essentially symmetrical groove profile are:

easier manufacturing of diffraction devices such as dispersive elements, polarization elements for light beams of short wavelength, in particular UV range elements, suppression of the problem of overlapping orders in spectroscopic gratings, useability of surface and index modulation phenomena characterized by relatively large and tunable period such as Surface Acoustic Waves (SAWs).

BRIEF DESCRIPTION OF THE DRAWINGS

The present invention, and various uses and applications thereof will be described hereafter with the aid of the following description made with reference to the annexed drawings which are given only by way of examples, in which:

FIG. 3 is the projection of the k-vector reciprocal space in a plane parallel to the surface of the device of the invention FIG. 4 is the projection of the reciprocal space in a plane parallel to the device surface in the diffraction regime of a first configurational embodiment FIG. 5 is the projection of the reciprocal space in a plane parallel to the device surface in the diffraction regime of a second configurational embodiment FIG. 10 represents a first applicative embodiment of the device of the invention to a notch filter.

FIG. 14 is the cross-sectional view of the diffractive element of a $7^{th}$ applicative embodiment using frequency encoded high frequency carrier FIG. 15 is the cross-sectional view in a plane parallel to the incidence plane of binary dual-frequency diffractive element as an $8^{th}$ applicative embodiment FIG. 16 is the cross-sectional view in a plane parallel to the incidence plane of a $9^{th}$ applicative embodiment of the device of the invention to a back light illumination system FIG. 17 is the projection of the reciprocal space in a plane parallel to the device surface corresponding to an $11^{th}$ applicative embodiment to a right angle beam splitter FIG. 19 is the representation of a variable period monochromator diffractive element according to the invention as an $13^{th}$ applicative embodiment. FIG. 26 is the cross-sectional view of a $22^{nd}$ applicative embodiment of the device of the invention to pump trapping in a wide area, thin optical amplifying layer.

DETAILED DESCRIPTION OF ILLUSTRATIVE EMBODIMENTS

Figure 1:
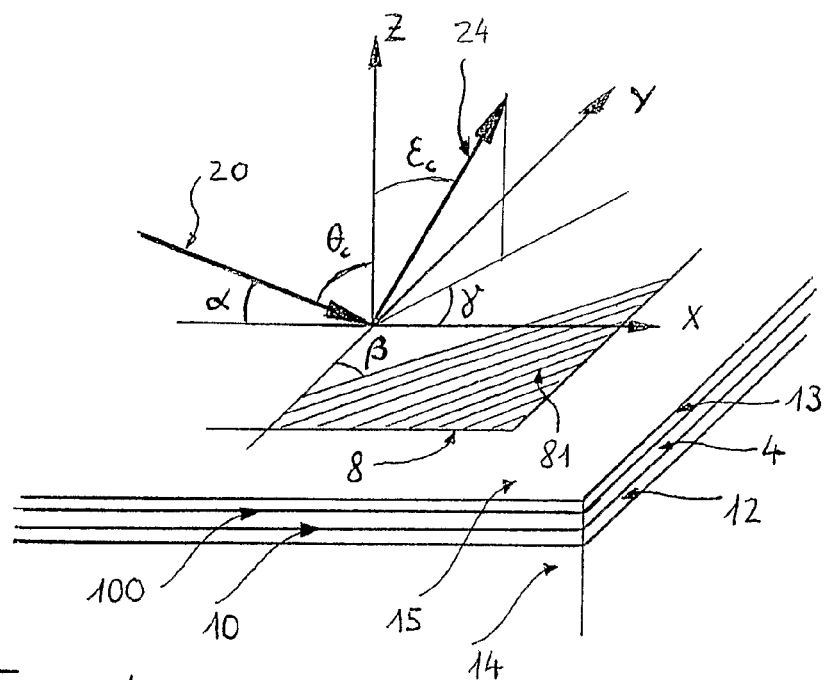
FIG. 1 is the perspective view of the device of the invention in the direct (x, y, z) space

FIG. 1 is the perspective view of a device according to the invention in the direct (x, y, z) space. The dielectric or semiconductor layer 4 of refractive index $n_f$ and mean height H is bounded by the highly reflective structure 12 at its lower side 10 and by the semi-reflective structure 13 at its upper side 100. The refractive index $n_f$ of layer 4 may be a continuous graded index or a stepwise function of coordinate z. By highly reflective structure 12 we understand an interface which has substantially a 100% reflection between two media. This interface can be a simple metal surface, or a dielectric or semiconductor multilayer mirror, or a dielectric dioptre under total internal reflection condition, or a resonantly reflective grating, or a set of two phase shifted gratings. By semi-reflective structure 13 we understand a reflective layer or film (dielectric or semiconductor or metallic) or a multilayer structure or a resonantly reflective grating or similar structure. Under the reflective structure 12 is the substrate medium 14 of refractive index $n_s$ which can be air. A diffractive structure 8 is arranged between layer 4 and semi-reflective structure 13 and/or within them. Diffractive structure 8 can be an index modulation within layer 4, made by ion exchange, or ion implantation, or diffusion, or photo-modification. It can also be a modulation of at least one of the components of the permittivity tensor of layer 4 in case layer 4 exhibits an electro-optic or magneto-optic effect under an externally applied electric or magnetic field. Diffractive structure 8 can also be a corrugation at one or at both sides 10 and 100 of layer 4. The groove lines 81 of structure 8 need not be periodically arranged side by side and need not be straight lines. The local grating vector $K_g$ of structure 8 ($K_g=2\pi/\Lambda$ where $\Lambda$ is the local period of the diffractive element 8) needs not be in the incidence plane. An incident wave 20 makes an angle $\theta_c$ relative to the normal to the layer general plane (x-y) in the cover medium 15 of refractive index $n_c$ which can be air. The incident beam 20 is refracted in layer 4 under the angle $\theta_f$ relative to the normal to layer 4. The incident wave 20 and the normal to the layer general plane (x-y) define the incidence plane containing the x axis. Axis y is in the plane of layer 4 and normal to x. Axis z is normal to general plane (x-y). The general plane of the device is defined at the level of the bottom side 10 of layer 4; unless specified otherwise, the origin of axis z is placed at the bottom side 10 of layer 4. There is also a $-1^{st}$ order diffracted beam directed towards the substrate medium 14 making an angle $\in_f$ in layer 4 relative to the normal to (x-y) plane. The angle $\alpha$ is the complementary angle of $\theta_c$ in the incidence plane. The lines 81 of the diffractive structure 8 make locally at point (x,y) in the plane of layer 4 an angle $\beta$ with the axis y. The $-1^{st}$ order diffracted beam 24 is locally directed into the cover medium under the angle $\in_c$ relative to the normal to the general plane (x-y). The $-1^{st}$ order diffracted beam 24 is the superposition of the $-1^{st}$ diffracted order directly reflected by structure 8 and of the $-1^{st}$ transmitted order reflected by structure 12. The $-1^{st}$ order local diffraction plane is normal to the (x,y) plane and contains the $-1^{st}$ diffracted order; it makes locally at point (x,y) of the plane of layer 4 an angle $\gamma$ with the x axis. The local mean height H(x,y) of layer 4 is such that at wavelength $\lambda$ and under incidence angle $\theta_c$ the incident wave 20 excites by refraction a leaky mode of layer 4. An order m of the diffractive structure 8 is said negative when the projection of its $K_g$-vector, $mK_g$, on the plane of incidence is opposite to the projection of the k-vector of the incident beam 20 on the plane of layer 4.

According to the invention the incident wave excites a leaky mode of layer 4 by refraction into said layer through semi-reflective structure 13. A leaky mode is a transverse field resonance, propagating along x with propagation constant $n_c k \sin \theta_c$ (or effective index $n_c \sin \theta_c$) smaller than the propagation constant $n_c k$ of a free space wave propagating in the cover medium 15, leaking into cover medium 15 by refraction.

Figure 2:
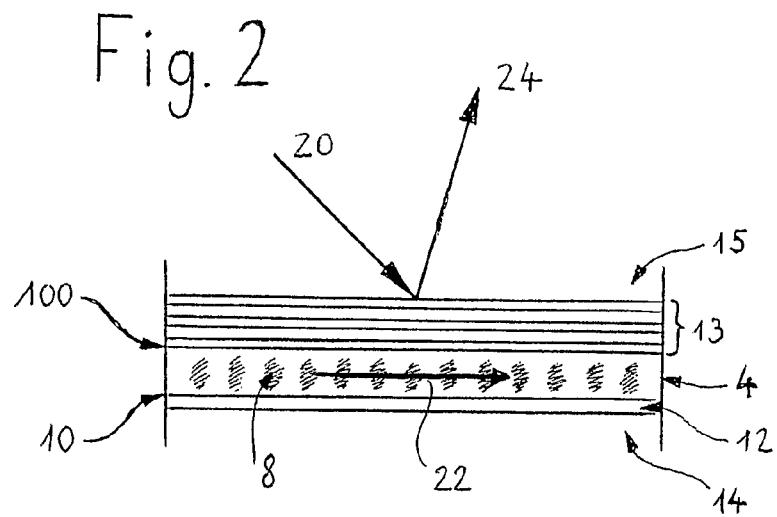
FIG. 2 is the cross-sectional view of a device of the invention parallel to the incidence plane

FIG. 2 represents a device according to the invention with semi-reflective structure 13 arranged at the upper side 100 of layer 4 between layer 4 and the cover medium 15. The general plane 4A of the device, containing the axes x and y, is identical to the bottom side 10 of layer 4. The incident beam 20 excites by refraction into layer 4 at least one leaky mode 22. Semi-reflective structure 13 can consist of a single thin dielectric or semiconductor film of refractive index $n_b$ such as amorphous silicon for example since non-absorptive in the red and infrared part of the spectrum, or of a high index metal oxide such as $ZrO_2$, $HfO_2$, $Ta_2O_5$, $TiO_2$; it can also advantageously consist of a transparent electrode such as $SnO_2$ or ITO when layer 4 consists of an electrooptic material. The thin film thickness $t_b$ is chosen so as to give rise to the largest possible reflection for a given incident beam. The reflection coefficient of the single thin film is larger than the reflection coefficient of the interface 100 between the cover medium 15 and layer 4 if $n_b$ is larger than $n_c$ and $n_f$ or if $n_b$ is smaller than $n_c$ and $n_f$; furthermore, the reflection coefficient of the single thin film is maximum when the thin film thickness $t_b$ corresponds to an odd number $m_b$ of "$\lambda/4$" thickness, i.e., if $(2\pi/\lambda)n_b t_b \cos \theta_b = \pi m_b/2$ where $\theta_b$ is the angle which the beam refracted from beam 20 makes in the said single thin film. The single thin film can also be a very thin, semi-transparent film of low loss metal such as silver, gold or aluminium; the reflection coefficient is an increasing function of the metal thickness; as is known to those familiar with the art, the metal film thickness should preferably not correspond to the situation where its transmission and reflection are approximately equal because this would lead to a maximum dissipation loss (this maximum dissipation thickness is about 20 to 30 nm depending on the type of metal and on the wavelength); relatively low metal loss can thus be achieved with a metal film thickness larger or smaller than this loss maximum thickness. Semi-reflective structure 13 can also be an ion implanted low index layer (for instance $H^+$ or $He^+$ implanted ions in a $LiNbO_3$ or $KNbO_3$ or in any other nonlinear crystal); this is particularly advantageous when layer 4 is made of a crystalline dielectric or semiconductor material; these are difficult to grow in a layer form; in such structure the cover medium 15 and layer 4 are made of the same material, mirror 12 and optional substrate 14 being deposited or bonded. Semi-reflective structure 13 can also be a thin air or vacuum layer obtained by wet etching of a sacrificial layer sandwiched between layer 4 and cover medium 15 as often realized in planar microsystem technologies.

As illustrated in FIG. 2, semi-reflective structure 13 can be made of a number of dielectric or semiconductor layers of alternating index for increasing the reflection coefficient at the upper side 100 of layer 4 for the leaky mode 22. Semi-reflective structure 13 is preferably designed to exhibit a low reflection coefficient for the $-1^{st}$ order diffracted beam directed towards side 10 of layer 4 then reflected by structure 12. Without semi-reflective structure 13, the reflection coefficient of the leaky mode at side 100 of layer 4 is simply the Fresnel reflection coefficient between layer 4 and the cover medium 15; without structure 13, a sharp leaky mode resonance takes place in the neighbourhood of grazing incidence when $n_f > n_c$, or in the neighbourhood of the critical angle when $n_f < n_c$ since the reflection becomes close to 100%. In the presence of structure 13, it is possible to increase the reflection coefficient at the upper border 100 of layer 4 to obtain high, close to 100% diffraction efficiency and a sharp leaky mode resonance for an arbitrary incidence angle $\alpha$ and by means of a weak diffractive structure. This device according to the invention is particularly advantageous for increasing the brightness of identification and security holograms observed in reflection since strong incident field accumulation in the leaky mode and high diffraction efficiency can be achieved under incidence and diffraction angles corresponding to beams 20 and 24 which are not trapped in the cover medium 15 but which can be excited from the outside or which can be seen by an external observer; as an example a high visibility hologram comprises a polymer cover medium 15, a high index leaky mode field enhancement semi-reflective structure 13 made of ZnS or of a low index $MgF_2$ layer sandwiched between two ZnS layers for instance, low index layer 4, a metal mirror 12 and a diffractive element 8 embossed at the surface of substrate 14. Another domain of application for the device of the invention in the presence of semi-reflective structure 13 is in headup displays where a diffractive element according to the invention is fabricated on a transparent substrate window 14, the observer seeing the scene behind the window while also seeing the superposed image of a display (that of a cathode ray tube for instance) placed outside the line of sight and diffracted into the eye of the observer. It is also particularly advantageous in data or image storage applications for increasing the efficiency of holograms registered in layer 4 without reducing the number of holograms which can be stored in layer 4. It is also particularly advantageous for increasing the diffraction efficiency of electrically and optically active holograms or gratings where the refractive index modulation is small or where it is preferred for cost or compactness or packaging reasons to generate holograms in a thin film rather than in a thick film.

An example where the refractive index modulation is particularly small is in the UV exposure of an index grating in hydrogen or deuterium loaded germanosilicate films as described in document M. Svalgaard, "Optical waveguides and gratings made by UV-photogeneration", Proceedings of the European Conference on Integrated Optics ECIO'99, Turin, Italy, April 1999, pp. 333-338. Document U.S. Pat. No. 6,219,478 B1 provides the means for achieving high, close to 100% diffraction efficiency in the presence of a small index modulation by either using grazing incidence when $n_f > n_c$ or close to critical incidence when $n_f < n_c$; those familiar to the art of diffraction would not expect high diffraction efficiency for a free space wave from a refractive index modulation of less than $10^{-2}$ in a thin film for arbitrary incidence and diffraction angles; the present invention enables this by means of semi-reflective structure 13.

In the presence of semi-reflective structure 13, the right hand term of the leaky mode characteristic equation is completed explicitly by $-\phi_c/2$, $\phi_c$ being the phase of the reflection coefficient of structure 13 upon incidence from layer 4: $kH(n_f^2 - n_c^2 \cos^2\alpha)^{1/2} = m_{1m}\pi - \phi/2 - \phi_c/2$ where $k = 2\pi/\lambda$ is the free space wave number, $\lambda$ being the wavelength in vacuum, $m_{1m}$ is the leaky mode order and H is the mean thickness of layer 4. In the presence of a corrugation grating the mean thickness is the thickness of layer 4 if the corrugation was absent and all material of permittivity $n_f^2$ in the grating teeth was filling the grating grooves so as to make layer 4 of uniform thickness. In case the grating is a weak modulation of the refractive index $n_f$ of layer 4, the value for $n_f$ in the above leaky mode dispersion equation is the average value of the modulated refractive index. A particularly advantageous situation regarding polarisation takes place in the presence of semi-reflective layer 13; in case both reflective structures 12 and 13 are multilayers composed of essentially the same low and high index layers, and if the first layer of both multilayers at the sides of layer 4 are essentially the same, (either low of high index), the leaky mode resonance condition for TE and TM leaky modes is the same. The leaky mode resonance condition for TE and TM polarizations is the same when the reflection phase shift $\phi + \phi_c$ for both polarizations is identical modulo $2\pi$. This does not imply that both TE and TM diffraction efficiencies can be close to 100% simultaneously; this implies that both diffraction efficiencies can be high simultaneously provided the incidence of the TM polarization is outside the Brewster angle region since the field accumulation condition is the same for both polarizations. In case mirror 12 consists of a dielectric multilayer, the multilayer is designed so as to exhibit substantially zero transmission for the excited leaky mode 22, and also for the $-1^{st}$ diffraction order directed towards substrate 14; this in particular means that the transmission of the whole structure comprising structure 13, the layer 4 and structure 12 without the presence of the diffractive element 8 is cancelled when the leaky mode resonance condition is fulfilled.

In the presence of semi-reflective structure 13, the diffractive structure 8 can be arranged at the upper face 100 of layer 4. It can also be arranged at the bottom face of the cover medium 15. It can also consist of an undulated multilayer structure 13. The corrugation is preferably placed at the interface(s) where the leaky mode electric field is large. It can also consist of a modulation of the refractive index of layer 4, both sides 10 and 100 of layer 4 and structure 13 being substantially flat, as represented as an example in FIG. 2.

In case the reflective structures 12 and/or 13 are made of a dielectric multilayer, the field of the leaky mode of layer 4 used in the invention extends into structures 12 and 13, a leaky mode being still defined as a propagating field resonance whose projection of the k-vector on the (x,y) plane is smaller than $kn_c$. The phaseshift terms $\phi$ and $\phi_c$ to be introduced in the characteristic equation of the leaky mode in the quarter wave dielectric multilayer case are close to 0 or $\pi$ depending on the leaky mode polarization, whether the first layer of the multilayer at the side of layer 4 is of low or high index, and depending on the incidence angle $\theta_f$ as is known to those familiar with the laws of reflection.

In case layer 4 is a graded index layer of refractive index $n_f(z)$ varying across the layer, the term $kH(n_f^2 - n_c^2 \cos^2\alpha)^{1/2}$ in the characteristic equation of a leaky mode is replaced by a definite integral of $k(n_f^2(z) - n_c^2 \cos^2\alpha)^{1/2}dz$ along z across layer 4, the phases $\phi$ and $\phi_c$ being defined as the phase shift upon reflection at the interface between a medium of index $n_f(0)$ and structure 12, and upon reflection at the interface between a medium of index $n_f(H)$ and structure 13, respectively, the origin of z being located at side 10 of layer 4. In case layer 4 consists of a set of sublayers of different refractive index, $n_f(z)$ is a stepwise function; the dispersion equation of a leaky mode propagating in layer 4 is easily obtained by those familiar to the art of composite slab waveguides by 2×2 matrix multiplication as described in document by J.-D. Decotignie, O. Parriaux, F. E. Gardiol, "Wave propagation in lossy and leaky planar optical waveguides", AEÜ, Band 35, 1981, pp. 201-204, the phases $\phi$ and $\phi_c$ being defined between the first sublayer at side 10 of layer 4 against structure 12 and the last sublayer at side 100 of layer 4 against structure 13, respectively, a leaky mode being usually defined as a transverse field resonance leaking by refraction into cover medium 15 whose effective index is smaller than $n_c$, in other terms, whose propagation constant $n_c k \sin \theta_c$ in the direction x is smaller than $n_c k$. A continuous or stepwise varying index $n_f(z)$ of layer 4 is useful for tayloring the dispersion of the leaky mode, for instance for the purpose of satisfying the leaky mode dispersion equation over a broadened wavelength domain.

In case the reflective structure 12 consists of a multilayer, the multilayer can comprise a metal layer at the substrate side of the multilayer to help reflect the $-1^{st}$ transmitted order propagating towards substrate 14, or/and to help cancel the transmission of reflective structure 12 for the leaky mode 22.

FIGS. 3 to 6 represent four configurational embodiments of the invention in the reciprocal space of the k- and $K_g$-vectors. They all four rely upon the excitation of a leaky mode, the large damping and possible cancellation of the zero$^{th}$ order in the Fresnel reflection direction, and therefore high diffraction efficiency for the sole $-1^{st}$ order outside the $-1^{st}$ order Littrow configuration as disclosed in document U.S. Pat. No. 6,219, 478 B1.

FIG. 3 is the $(k_x, k_y)$ plane projection of the reciprocal space of the k-vectors in a plane parallel to plane (x,y). The projection OP of the incident k-vector, $n_c k \cos \alpha$, is along $k_x$ where $k = 2\pi/\lambda$ is the vacuum wave number, $\lambda$ being the vacuum wavelength. The local $K_g$-vector of the diffractive structure 8, normal to the local lines of the diffractive structure, makes locally an angle $\beta$ with the $k_x$ axis. The local projection of the k-vector of the $-1^{st}$ order wave diffracted locally, $n_c k \sin \in_c$, making locally the angle $\gamma$ with the $k_x$ axis is the vectorial sum in the $(k_x, k_y)$ plane of the incident beam k-vector projection and of the local $K_g$-vector of the diffractive structure. The projection in the $(k_x,k_y)$ plane of the k-vector of the leaky mode used in the device of the invention is equal to $n_c k \cos \alpha$ since a leaky mode is excited by refraction of the incident wave 20 into layer 4. For sake of clarity of the figures the incident beam 20 is arbitrarily directed towards the positive direction of the x axis; similarly, the grating $K_g$-vector, and consequently the diffracted beam 24, are arbitrarily directed towards the positive direction of the $k_y$ axis. This is not a restriction to the applicability of the device of the invention. In particular, the angular domain of $\beta$ as defined in FIG. 3 is between −90 and +90 degrees although most often represented with a positive value. The incident beam 20 impinging onto the diffractive structure 8 needs not be a collimated beam; in the device of the invention the scalar product between the local vector projection $n_c k \cos \alpha$ in the plane of layer 4 of all k-vector components of the incident beam 20 and the local $K_g$-vector of diffractive structure 8 is negative and the sole non-zero diffraction order excited efficiently locally by the diffractive structure 8 is the −1$^{st}$ order. Furthermore, in the device of the invention beam 20 needs not be unique; there can be more than one incident beam impinging onto diffractive structure 8.

The set of high efficiency diffraction devices of the invention encompasses four configurational embodiments corresponding to four distinct diffraction regimes a), b), c) and d) which will be described hereafter. The common feature of all four diffraction regimes is that beam 20 excites by refraction at least one leaky mode 22 of layer 4, and that the field leaking from the leaky mode into cover medium 15 interferes destructively in the direction of the Fresnel reflection with the beam directly reflected by the side 100 of layer 4 or by semi-reflective structure 13 so as to damp and to possibly cancel the interference product in the Fresnel reflection direction.

The device disclosed by document U.S. Pat. No. 6,219,478 B1 permits to obtain high, possibly 100% −1$^{st}$ order diffraction efficiency within and outside the incidence plane regardless of the −1$^{st}$ order diffracted beam polarization state resulting from the polarization coupling occurring in a non-collinear diffraction configuration since it relies upon the damping and possible cancellation of the Fresnel reflection; this damping and possible cancellation of the reflected zero$^{th}$ order is an interference mechanism which can be completely destructive since it takes place within the plane of incidence without polarization conversion. The presence of semi-reflective structure 13 allows close to 100% −1$^{st}$ order diffraction efficiency within or outside the incidence plane to be obtained in the cases where the device of U.S. Pat. No. 6,219,478 B1 does not. In particular, it allows close to 100% −1$^{st}$ order diffraction efficiency in cases where the local period of the diffractive element 8 is large relative to the wavelength and where the incidence angle $\theta_c$ is small ($\alpha$ large) by using the property of a weak grating (small surface corrugation or small index modulation amplitude) to have diffraction order efficiencies proportional to the Fourier coefficients of its harmonics. The presence of structure 13 allows furthermore to control the spectral and angular width of the leaky mode resonance, i.e., the spectral and angular width over which high diffraction efficiency can be obtained. Since close to 100% diffraction efficiency outside the incidence plane is achievable by exciting a leaky mode of a given linear polarization by an incident beam 20 of the same polarization, the device of the invention can act as a low loss polarization converter.

a) Diffraction of the sole −1$^{st}$ propagating diffraction order outside the incidence plane FIG. 4 illustrates the condition for the propagation of the sole −1$^{st}$ order in the incidence medium 15 of index $n_c$ in the reciprocal space $(k_x,k_y)$ of the k-vectors. Note that $\beta=0$ when vector components $k_x$ and $K_g$ have opposite directions. The incident beam 20 makes an angle $\alpha$ relative to the layer plane (x,y). The condition for the sole −1$^{st}$ order to propagate in the incidence medium 15 in addition to the 0$^{th}$ reflected order is $PQ > |K_g| > \max\{PQ/2, PQ'\}$.

The above condition excludes the propagation of the +1$^{st}$ order and of the −m$^{th}$ orders with m>1, and ensures that the −1$^{st}$ and 0$^{th}$ reflected orders only can propagate in the incidence medium. The case of −1$^{st}$ order Littrow incidence is excluded. Curve $T_a$ of FIG. 4 represents the conditions for the sole existence of the −1$^{st}$ order for a particular value of the incidence angle $\alpha$: as $\beta$ increases from zero (collinear case), the minimum modulus $|K_g|$ ensuring that the −2$^{nd}$ order points just outside the circle of radius $n_c k$ decreases and reaches a minimum value at $\beta=\beta_m$ in the situation where the +1$^{st}$ order would start propagate. For $\beta>\beta_m$, $|K_g|$ must increase for satisfying the condition of non-propagation of the +1$^{st}$ order.

A straightforward algebraic treatment results in the more explicit condition for the sole −1$^{st}$ propagating order involving all optogeometrical parameters:

$$n_c k[\cos \alpha \cos \beta + (1-\cos^2 \alpha \sin^2 \beta)^{1/2}] >> |K_g| > \max\{n_c k/2 - [\cos \alpha \cos \beta + (1-\cos^2 \alpha \sin^2 \beta)^{1/2}], n_c k[-\cos \alpha \cos \beta + (1-\cos^2 \alpha \sin^2 \beta)^{1/2}]\}$$

In particular, the minimum of $|K_g|$, i.e., the maximum local period $\Lambda_m$ of the diffractive element, is given by $PQ/2 = PQ'$ which amounts to $\cos \beta_m = \tan\alpha/(8)^{1/2}$, i.e., to a minimum for $K_g$ of $0.707 n_c \sin \alpha$. For the same incidence angle $\alpha$, but with the −1$^{st}$ order in the incidence plane, the minimum possible value of $|K_g|$ ensuring the propagation of the sole −1$^{st}$ order is $n_c k(1+\cos \alpha)/2$. Therefore, the ratio of the maximum period $\Lambda_m(\beta)$ (−1$^{st}$ order off the incidence plane) to the maximum period $\Lambda_m(0)$ (−1$^{st}$ order in the incidence plane) for the same incidence angle $\alpha$ is $$\Lambda_m(\beta)/\Lambda_m(0) = (8)^{1/2}/\tan\alpha/2.$$

In particular, if the incidence is grazing, for instance $\alpha=0.1$ radian, the condition for 100% efficiency of the −1$^{st}$ order outside the incidence plane is obtained with a local period $\Lambda$56 times the maximum period with the −1$^{st}$ order in the plane of incidence.

The angle $\in_c$ of the −1$^{st}$ order with respect to the normal to the layer plane (x,y) is given by $\sin \in_c = (n_c^2 k^2 \cos^2\alpha + K_g^2 - 2n_c k K_g \cos \alpha \cos \beta)^{1/2}/(n_c k)$ and the angle $\gamma$ with respect to the x axis of the projection of its k-vector on the layer plane is $\sin \gamma = K_g \sin \beta (n_c^2 k^2 \cos^2\alpha + K_g^2 - 2n_c k K_g \cos \alpha \cos \beta)^{-1/2}$. The angle $\gamma$ is to be taken in the 2$^{nd}$ quadrant when $n_c k \cos \alpha < K_g \cos \beta$.

Curve $S_a$ of FIG. 4 is the locus of the extremity of the $K_g$-vector of minimum modulus with the incidence angle $\alpha$ as a parameter. The locus is given by the parametric equation $\cos \beta = (8)^{-1/2} \tan\alpha$, and $|K_g| = 0.707 n_c k \sin \alpha$. The locus is also given by the following equation in the $(k_x,k_y)$ plane by $\eta^2 = (-17\chi^2 + 5 + -4\chi(4\chi^2+5)^{1/2})/25$ where $\eta = k_y/(n_c k)$, $\chi = k_x/(n_c k)$, one point $(\chi,\eta)$ of the locus corresponding to $kn_c \cos \alpha = (\eta^2 + \chi^2)^{1/2} n_c k$ and $K_g = 0.707 kn_c \sin \alpha$.

The presence of semi-reflective structure 13 in the first configurational embodiment a) enables high diffraction efficiency by means of a weak diffractive structure essentially whatever the incidence and diffraction conditions; in particular, it enables to reach close to 100% diffraction efficiency in cases where the device of U.S. Pat. No. 6,219,478 B1 can not, in particular under small incidence angle; also, it enables high angular and spectral selectivity.

b) Diffraction of the sole $-1^{st}$ propagating order in the presence of the $-2^{nd}$ propagating order The set of diffraction devices exhibiting up to 100% diffraction efficiency for the $-1^{st}$ order outside and inside the incidence plane can be extended in the presence of semi-reflective structure 13 to cases where the $-2^{nd}$ order can propagate, but where its diffraction efficiency is close to zero which happens for instance when the line/space ratio of a rectangular groove grating is substantially equal to 50/50 in a sufficiently shallow diffractive structure of sufficiently large local period. The rationale of U.S. Pat. No. 6,219,478 B1 applies: the reflected light has nowhere else to propagate but to be diffracted in the $-1^{st}$ order.

Referring to FIG. 5, the condition allowing the $-2^{nd}$ order of close to zero diffraction efficiency (i.e., a line/space ratio of essentially 1 in a shallow and large period diffractive element), and forbidding the $+1^{st}$ diffraction order is:

$$PQ > |K_g| > \max\{PQ/3, PQ'\}.$$

FIG. 5, curve $T_b$, represents the above condition for a given angle of incidence $\alpha$ as in FIG. 4 for the possible directions $\beta$ of the local $K_g$-vector. The modulus of $K_g$ ensures that the $-3^{rd}$ order just points outside the circle of radius $n_ck$. $|K_g|$ decreases with increasing $\beta$ down to its minimum value at $\beta=\beta_m$, and increases again so as to prevent the propagation of the $+1^{st}$ order.

The condition for allowing the propagation of the $-2^{nd}$ order of close to zero diffraction efficiency and forbidding the $+1^{st}$ order involving all optogeometrical parameters is:

$$n_ck[\cos\alpha\cos\beta+(1-\cos^2\alpha\sin^2\beta)^{1/2}]>|K_g|>\max\{n_ck/3[\cos\alpha\cos\beta+(1-\cos^2\alpha\sin^2\beta)^{1/2}], n_ck[-\cos\alpha\cos\beta+(1-\cos^2\alpha\sin^2\beta)^{1/2}]\}$$

In particular, the minimum of $|K_g|$, i.e., the maximum local period $\Lambda$, is given by $PQ/3=PQ'$ which amounts to $\cos\beta=\text{tg}\alpha/(3)^{1/2}$, i.e., a minimum for $K_g$ of $(3)^{-1/2}n_ck\sin\alpha$.

For the same incidence angle $\alpha$, but with the $-1^{st}$ order in the incidence plane, the minimum possible value of $|K_g|$ is $n_ck(1+\cos\alpha)/2$. Therefore, the ratio of the maximum period $\Lambda_m(\beta)$ to the maximum period $\Lambda_m(0)$ for the same incidence angle is $$\Lambda_m(\beta)/\Lambda_m(0)=2(3)^{1/2}/\text{tg}\alpha/2$$

In particular, if the incidence is grazing, for instance, $\alpha=0.1$ radian=5.7 degrees, the condition for 100% efficiency of the $-1^{st}$ order outside the incidence plane is obtained with a grating period of 69 times the maximum period with the $-1^{st}$ order in the plane of incidence.

Curve $S_b$ of FIG. 5 represents the locus of the extremity of the $K_g$ vector of minimum modulus with the incidence angle $\alpha$ as a parameter. The locus is given by the parametric equation $\cos\beta=(3)^{-1/2}\text{tg}\alpha$, and $|K_g|=(3)^{-1/2}n_ck\sin\alpha$. The locus is also given by the following equation in the $(k_x,k_y)$ plane by $(\eta^2+\chi^2)(\chi^2+4\eta^2)-\chi^2=0$ where $\eta=k_y/(n_ck)$, $\chi=k_x/(n_ck)$, one point $(\chi,\eta)$ of the locus corresponding to $n_c k\cos\alpha=n_ck(\eta^2+\chi^2)/\chi$ and $K_g=0.5n_ck(1-(\chi^2+\eta^2))^{1/2}$.

The presence of semi-reflective structure 13 in the second configurational embodiment b) enables high diffraction efficiency for the sole $-1^{st}$ diffraction order under essentially any incidence angle by means of a shallow binary diffractive structure of 50% duty cycle even in the possible propagation of the $-2^{nd}$ diffraction order as a result of the diffraction efficiency being in the shallow grating case proportional to the corresponding harmonic amplitude in the Fourier development of the grating grooves.

c) Diffraction of the sole $-1^{st}$ order in the presence of any number of propagating negative orders.

The set of diffraction devices exhibiting up to 100% diffraction efficiency outside and inside the incidence plane is further extended if the following conditions are satisfied. As above, the $+1^{st}$ diffraction order is forbidden and the $-1^{st}$ order Littrow incidence is excluded. The period is large enough, and the diffractive element grooves are shallow enough with respect to the wavelength to lead to a situation where the diffraction efficiency of order m is essentially proportional to the amplitude of the $m^{th}$ Fourier harmonics of the local grating. This means that a locally sinusoidal undulation or index modulation will give a non-negligible diffraction efficiency to the sole $+1$ and $-1^{st}$ diffraction orders even though a large number of negative orders may propagate. The rationale of U.S. Pat. No. 6,219,478 B1 applies: the light has nowhere else to propagate but to be efficiently diffracted into the $-1^{st}$ order since the propagation of the $+1^{st}$ order is forbidden.

For this $3^{rd}$ set of diffraction devices the condition to fulfil is: no propagating positive order, i.e. $|K_g|>n_ck[-\cos\alpha\cos\beta+(1-\cos^2\alpha\sin^2\beta)^{1/2}]$, and substantially sinusoidal groove profile (either corrugation or index modulation).

Figure 6:
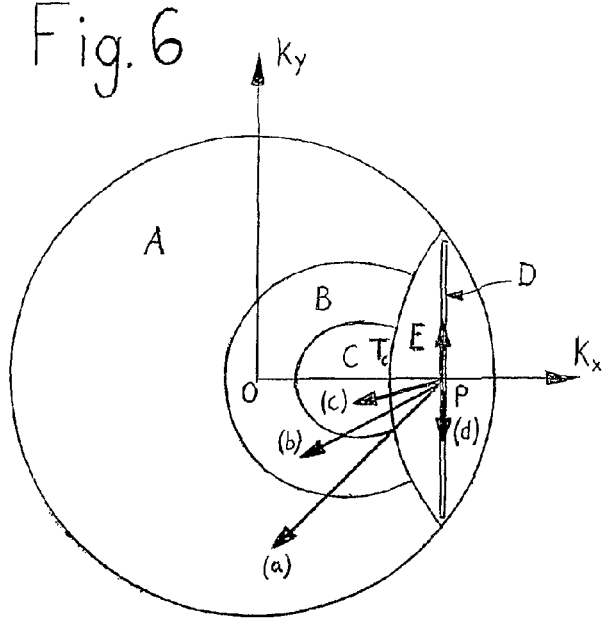
FIG. 6 is the projection of the reciprocal space of all diffraction regimes of the device of the invention

Curve $T_c$ of FIG. 6 is the locus of the tip of the $K_g$-vectors in the $(k_x,k_y)$ plane, the modulus $|K_g|$ just preventing the propagation of the $+1^{st}$ order in the condition of small incidence angle $\alpha$. It is an arc of circle $|K_g|=n_ck(-\cos\alpha\cos\beta+(1-\cos^2\alpha\sin^2\beta)^{1/2})$. The arc of circle $T_c$ is the symmetrical arc with respect to P of the arc of circle of radius $n_ck$. $T_c$ writes $|K_g|=n_ck\alpha^2/(2\cos\beta)$ essentially in the case of grazing incidence. This condition is also valid for collinear diffraction ($\beta=0$),i.e., where diffraction takes place in the plane of incidence: the diffraction efficiency can be close to 100% in the condition of grazing incidence, long period and sinusoidal groove profile.

The presence of semi-reflective structure 13 in the third configurational embodiment c) enables high diffraction efficiency for the sole $-1^{st}$ diffraction order under essentially any incidence angle by means of a shallow sinusoidal surface undulation or weak index modulation even in the possible propagation of higher negative diffractive orders as a result of the latter having in the shallow grating case essentially zero amplitude in the Fourier development of the grating grooves.

The configurational embodiment c), and, to some extent also, embodiment b), represent a novel way of grating blazing.

d) Diffraction of the sole first orders in a conical diffraction scheme.

At the limit where $\beta=90$ degrees, i.e., where the grating lines are parallel to the incidence plane in a purely conical diffraction configuration, positive and negative diffraction orders can not be distinguished any more and two diffracted beams of first order can each have close to 0.707 field diffraction efficiency per symmetry (i.e. 50% of diffracted power) provided $K_g$ satisfies $0.5n_ck\sin\alpha<K_g<n_ck\sin\alpha$ to prevent the second orders to propagate (according to embodiment a)), or provided $0.333n_ck\sin\alpha<K_g<n_ck\sin\alpha$ to prevent the third orders to propagate in case the groove line/space ratio is close to 50/50 and the period is large enough (according to embodiment b)), or provided $K_g<n_ck\sin\alpha$ and the groove profile is sinusoidal and the period large enough (according to embodiment c)), as illustrated in FIG. 6.

FIG. 6 is the map in the plane of the ($k_x$,$k_y$) reciprocal plane of all possible diffraction devices exhibiting high and possibly 100% diffraction efficiency. The circle of radius $n_c k$ has the center O. FIG. 6 is represented for a given incidence angle α. The projection of the incident k-vector, $n_c k \cos \alpha$, defines point P on the $k_x$ axis of the reciprocal plane. Five areas within the circle are numbered A, B, C, D and E. An example of $K_g$-vector is given for areas A, B, C and D; the corresponding diffraction events are numbered (a), (b), (c) and (d) respectively. Area A with representative example (a) represents all diffraction devices in which the sole diffracted order allowed to propagate is the $-1^{st}$ order. The grating profile of the diffraction devices belonging to area A can be arbitrary as long as it gives rise to large, possibly 100% diffraction efficiency. Area B with representative example (b) represents all diffraction devices in which the sole diffraction orders −1 and −2 are allowed to propagate and where the $-2^{nd}$ order has close to zero diffraction efficiency. The groove profile of the diffraction devices belonging to area B is such that the second order diffraction efficiency is negligible as for instance in a shallow rectangular profile of 50/50 line/space ratio. Area C with representative example (c) represents all diffraction devices in which an arbitrary number of negative diffraction orders may propagate and where the sole $-1^{st}$ order has a non-negligible diffraction efficiency as for instance in the case of a shallow, substantially sinusoidal profile corrugation. Area E is a forbidden zone corresponding to $K_g$-vectors for which the $+1^{st}$ order always propagates. Line D corresponds to the conical diffraction situation where two diffracted beams of each 50% diffracted power can be obtained as described in embodiment d).

In the above description of the four diffraction regimes corresponding to the four configurational embodiments, particular cases only have been illustrated in FIGS. 3, 4 and 5. The local values chosen for the parameters in the drawings are only illustrative. A diffraction device according to the invention may comprise a distribution of spatial frequencies $K_g(x, y)$ satisfying the diffraction conditions of configurational embodiment a) or b) or c) or d). Moreover, a diffraction device according to the invention may also comprise a distribution $K_g(x,y)$ belonging to more than one embodiment, for instance embodiments a) and b).

In all previous configurational embodiments the reciprocity theorem applies: the present invention also encompasses the inverse optical path incidence and diffraction configurations where the incident beam 20 has the same wavelength, polarisation and angle $\in_c$ relative to the normal to layer 4 as the diffracted beam 24, but propagates in the opposite direction; the backward propagating beam 24 excites the leaky mode propagating in the opposite direction by means of the same diffraction order of the diffractive element 8. The field accumulation in the leaky mode then leaks into the incidence medium 15 in the reversed direction of beam 20 with substantially 100% efficiency under an angle α relative to the (x,y) plane.

In all four configurational embodiments a), b) c) and d), the diffractive structure 8 can be arranged in layer 4, at its cover medium side 100 or at its reflective structure side 10, or at both sides 10 and 100 which naturally takes place when the diffractive structure 8 is first realised at one side of layer 4 before layer 4 is deposited, the other side having a substantially conformal surface undulation after the deposition of layer 4. A particularly advantageous configuration of a double undulation diffractive element 8, one undulation being at side 10 of layer 4 and the other undulation being at side 100 of layer 4, is characterized by the two undulations being shifted by half a period of structure 8 in the direction of the local $K_g$-vector; in this configuration of structure 8, the leaky mode field experiences at the sides of layer 4 dielectric permittivity perturbations relative to a uniform layer which have the same sign instead of having opposite sign when the two undulations are conformal; these dielectric perturbations representing the sources for the diffracted field, shifting one undulation relative to the other one by half a period gives an additional possibility to control the constructive interference condition of the diffracted products in the adjacent media. Diffractive structure 8 can also be arranged within layer 4 as a refractive index modulation in cases where the material of layer 4 is locally modified by ion implantation, diffusion or exchange, or exhibits photosensitivity or photochromism as in Dupont photopolymers, amorphous chalcogenide semiconductors, and doped sol-gels, or is subject to periodical compression as in the case of acoustic waves. Diffractive structure 8 can also be a periodic modulation of an off-diagonal component of the permittivity tensor of layer 4 caused by an external electric or magnetic field in case the material of layer 4 is electro- or magnetooptic. In this case the diffracted beam 24 has a polarization orthogonal to the polarization of the incident beam 20.

As from here, seven structural embodiments will be described.

In a first structural embodiment of the device according to the invention the thickness H(x,y) of layer 4 varies spatially in the (x,y) plane. In the direction x of the incidence plane the thickness variation must be slow to allow the accumulation of energy in a defined leaky mode; the layer thickness must remain substantially constant over a propagation length larger than the inverse of the damping rate of the leaky mode under the effect of the losses of mirror 12 if the latter is made of metal and of its leakage into the incidence medium 15 through semi-reflective structure 13. In the direction y orthogonal to the incidence plane, the layer thickness variation can be faster and give rise to a fast spatially varying leaky mode resonance.

The refractive index $n_f$ of layer 4 is preferably larger than the refractive index $n_c$ of the cover medium 15. However, in a second structural embodiment, $n_f$ can be smaller than $n_c$; for a leaky mode of layer 4 to be excited by an incident wave in a larger index cover medium 15, the incidence angle α is larger than the critical angle $\alpha = \arccos(n_f/n_c)$; furthermore, the characteristic equation is completed by writing explicitly the phase term $-\phi_c/2$ in the right hand term of the characteristic equation, $\phi_c$ being the partial reflection phase shift at the interface between layer 4 and the cover medium 15 upon incidence from layer 4. For instance, in the case of a TE incident wave, if $n_c > n_f$ and in the absence of the semi-reflective structure 13, $\phi_c = \pi$.

In a third structural embodiment of the device of the invention, reflective structure 12 consists of the simple dioptre between layer 4 and a substrate medium 14 of refractive index $n_s < n_f$ and $n_s < n_c$, the incidence angle α in medium 15 being smaller than $\arccos(n_s/n_c)$ so that there is total internal reflection at the lower side 10 of layer 4 for the zigzagging wave corresponding to the leaky mode used. The substrate medium is preferably air. In the characteristic equation the reflection phase shift φ at the reflective face 10 is known to be $\phi = -2 \arctan((n_c^2 \cos^2\alpha - n_s^2)/(n_f^2 - n_c^2 \cos^2\alpha))^{1/2}$ for the TE polarisation and $\phi = -2 \arctan(n_f^2/n_s^2 \; ((n_c^2 \cos^2\alpha - n_s^2)/(n_f^2 - n_c^2 \cos^2\alpha))^{1/2})$ for the TM polarisation. This lossless embodiment is particularly advantageous for notch filter applications where one spectral line is filtered out by diffraction by the $-1^{st}$ order whereas the rest of the spectrum does not excite a leaky mode and is therefore substantially 100% reflected in the direction of the Fresnel reflection.

This lossless embodiment is also particularly advantageous in back light illumination systems of flat displays or in lighting windows where the light is introduced into a light guiding plate or window from its sides. The light propagates in the light guide by total internal reflection. The device of the invention can extract light from the light guiding plate with large and controlled efficiency and also separate the fundamental colours since the leaky mode excitation takes place at discrete values of the wavelength.

In a 4$^{th}$ structural embodiment, the reflective structure 12 is a total internal reflector for the leaky mode and also for the $-1^{st}$ transmitted order propagating in the direction of substrate medium 14 under angle $\in_f$; this condition can be expressed on the local diffraction angle $\in_c$ as $\in_c >\arcsin(n_s/n_c)$. The 3$^{rd}$ and especially the 4$^{th}$ structural embodiments are particularly advantageous for monolithic diffractive light distribution back planes in optical interconnects.

Figure 7:
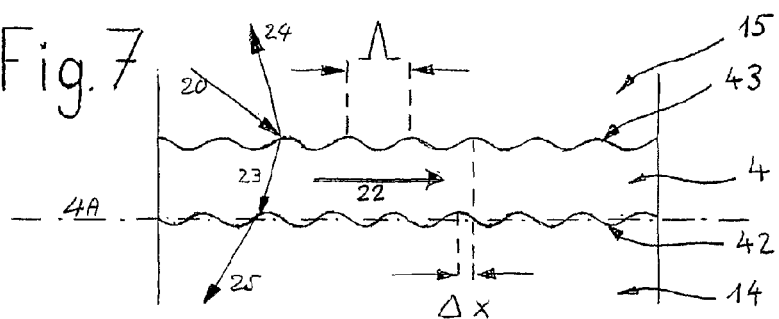
FIG. 7 is the cross-sectional view in a plane parallel to the incidence plane of a fifth structural embodiment of the device of the invention

A 5$^{th}$ structural embodiment of the invention is represented in FIG. 7. If reflective structure 12 is not a metal mirror, or if mirror 12 is not a total reflection mirror for the $-1^{st}$ order transmitted beam 23 propagating towards bottom side 10 of layer 4, high diffraction efficiency is obtained for the diffracted beam 24 into the cover medium 15 by using a double sided corrugated layer 4 with two corrugations 42 and 43. Diffractive element 8 is composed of two corrugations 42 and 43 at either side 10 and 100 of layer 4. FIG. 7 represents the general plane 4A of the device of the invention. The $-1^{st}$ order diffracted wave 24 is the result of the superposition of the two diffraction products of corrugations 42 and 43. The $-1^{st}$ order wave 25 diffracted into the substrate 14 is also the superposition of the diffraction products of the two corrugations 42 and 43 towards the substrate 14. The modulus of the field of the $-1^{st}$ order diffracted wave 25 into substrate 14 can be strongly decreased and possibly cancelled by shifting corrugation 43 with respect to corrugation 42 in the direction of their common $K_g$-vector by a distance $\Delta x$ leading to a destructive interference of the two diffraction products according to document I. A. Avrutsky, A. S. Svakhin, V. A. Sychugov and O. Parriaux, "High-efficiency single-order waveguide grating coupler", Optics Letters, Vol. 15, pp. 1446-1448, 1990. The diffraction efficiency of both corrugations 42 and 43 is made substantially equal by adjusting the relative depth of the corrugations or/and by adding an auxiliary corrugated layer. The essential condition to be fulfilled is that the waves of $-1^{st}$ order emitted by the two corrugations 42 and 43 in the direction of substrate 14 are out of phase. As a simple example, a device of the invention is composed of layer 4 of high index with reflective structure 12 being a multilayer starting at side 10 of said layer with a low index and semi-reflective structure 13 being also a multilayer starting at side 100 of said layer with a low index; the incident beam 20 excites the leaky mode 22 as the first order TE leaky mode whose transverse electric field is maximum with opposite signs at sides 10 and 100 and is zero close to the center of layer 4; the two corrugations 42 and 43 represent a periodic dielectric perturbation at both sides of layer 4; in the present example, the corrugation lines are orthogonal to the incidence plane; when $\Delta x$ is zero (the two corrugations are conformal as it happens if layer 4 is deposited onto corrugation 42) these two periodic corrugations are of opposite sign, consequently the elementary point sources excited by the leaky mode 22 and emitting the $-1^{st}$ order waves are in phase; those familiar with the art of diffraction know that the relative shift $\Delta x$ between corrugations causes a phase shift $\Delta \xi = K_g \Delta x$ between the diffraction products of corrugations 42 and 43; the condition on $\Delta x$ for a $\pi$ phase difference between the two $-1^{st}$ order diffraction products of corrugations 43 and 42 in the direction of substrate 14 is therefore given as $\Delta x = -\Lambda(H/\lambda n_f \cos \in_f (1+p)/2)$ where $\in_f$ is the diffraction angle of the $-1^{st}$ order propagating towards substrate 14 in layer 4 and p is a parity parameter equal to zero if the source terms on the two corrugations are in phase, and p=1 if the source terms are out of phase; if the TE modal electric field is even, p=1, if the modal electric field is odd, as in the present example, p=0. This condition on $\Delta x$ is general in the TE leaky mode case; it does not necessarily lead to a cancellation of the modulus of the transmitted diffracted beam 25, but it ensures that the latter is minimum, i.e., that the diffraction efficiency in the direction of beam 24 is maximum. Other cases (different polarization, both corrugations at the same side 100 of layer 4, different types of reflective structures 12 and 13) can be analysed similarly. The condition for the largest diffraction efficiency can then be more precisely found out in a given structure by resorting to an available diffraction code such as the full vector diffraction grating analysis software of Grating Solver Development Co., Allen, Tex. 75013. The phase shifted corrugation is achieved by dry etching of corrugation 43 under an angle or by deposition of layer 4 onto corrugation 42 under an angle. This embodiment is particularly advantageous in lighting applications from transparent plates or windows where the light sources are arranged at the edges of the plate, and in headup displays. It is particularly useful in cases where reflective structure 12 exhibits low reflectivity for the diffracted beam: the phase shifted double corrugation reduces the amplitude of the transmitted $-1^{st}$ diffraction order 25, therefore increases the reflected $-1^{st}$ order diffraction efficiency.

In the present 5$^{th}$ structural embodiment it is not always possible to exactly cancel the transmission of highly reflective structure 12 for the leaky mode 22.

Figure 8:
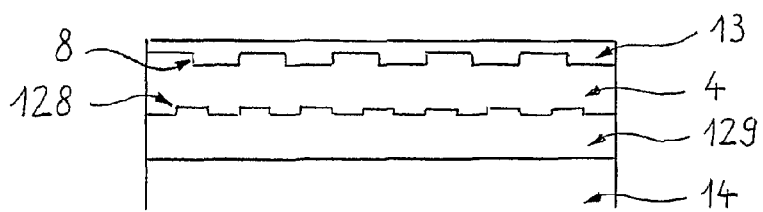
FIG. 8 is the cross-sectional view in a plane parallel to the incidence plane of a sixth structural embodiment of the device of the invention

A 6$^{th}$ structural embodiment of the invention is a narrow band device using as reflective structure 12 or/and as semi-reflective structure 13 a resonant mirror comprising a slab waveguide and a coupling grating under the condition of resonant reflection as described in document by G. A. Golubenko, A. S. Svakhin, V. A. Sychugov, and A. V. Tishchenko, "Total reflection of light from a corrugated surface of a dielectric waveguide", Soviet Journal of Quantum Electronics, Vol. 15, 1985, p. 886-887. FIG. 8 represents this 6$^{th}$ structural embodiment where reflective structure 12 is a resonant mirror. A slab waveguide 129 of refractive index $n_g > n_f$ has the substrate medium 14 at its bottom side. Layer 4 with grating 8 and semi-reflective structure 13 is on top of waveguide 129. A waveguide mode coupling grating 128 is made at one or both sides of waveguide 129. Grating 128 couples the incident beam 20 to a waveguide mode of waveguide 129 under the conditions for resonant reflection to occur from waveguide 129. These conditions are known to those familiar with the art to be first that the incidence angle, wavelength and polarization substantially satisfy the synchronism condition for the excitation of the selected waveguide mode, and secondly that $\alpha_{rg} w_b$ is much larger than 1 where $\alpha_{rg}$ is the radiation coefficient of the waveguide grating for the considered coupled propagation mode and $w_b$ is the width of the incident beam. Under these conditions the incident beam 20 is theoretically totally reflected by the grating waveguide in the direction of the Fresnel reflection into layer 4. The thickness of waveguide 129 is not related with the thickness H of layer 4, the period of coupling grating 128 is not related with the period of the diffractive structure 8. In the characteristic equation for the leaky mode a phaseshift $\phi$ of substantially $\pi$ accounts for the resonant reflection whatever incidence conditions. Such reflective structure 12 is wavelength, angularly and polarization selective. Reflective structure 12 can be made highly reflective for both the leaky mode and for the $-1^{st}$ order beam diffracted towards structure 12 by means of the same grating 8 by using two propagation modes of the same waveguide 129. The 6$^{th}$ structural embodiment is advantageous for head up displays for instance where a narrow line beam is efficiently diffracted in reflection in the presence of an essentially transparent substrate.

In another embodiment, reflective structure 12 is in the form of a multilayer mirror for both the leaky mode and the −1$^{st}$ diffraction order directed towards structure 12; semi-reflective structure 13 is a resonant waveguide mirror.

It is particularly advantageous to use an index modulated coupling grating 128 in an essentially flat waveguide 129, for instance made of a Dupont photopolymer, as a resonant mirror since this allows an easier fabrication of the diffractive element 8. In yet another embodiment the structural embodiments 5 and 6 are combined. As an example, the leaky mode confinement at side 10 of layer 4 is made by means of a resonant reflector 12 and grating 128 whereas the reflection of the −1$^{st}$ diffraction order 23 is made by means of a double sided grating 8 having shifted undulations; this embodiment is particularly advantageous for headup displays.

In structural embodiment 6, if the structure 12 is a multilayer mirror, its transmission into substrate 14 is essentially zero at the resonance of leaky mode 22. In particular, if the field accumulation in leaky mode 22 at resonance is large, structure 12 is such that the transmission of the incident beam 20 through structure 13, layer 4 and structure 12 in the absence of diffractive element 8 is equal or close to zero.

A 7$^{th}$ structural embodiment of the invention is a wide band filter providing large diffraction efficiency for the −1$^{st}$ diffraction order over a wide spectral range. This device of the invention relies upon the resonant phenomenon of leaky mode excitation. Unlike a truly guided mode of a dielectric waveguide, which is a perfectly lossless resonator, a leaky mode of layer 4 always leaks through the layer-cover medium interface. The larger the index difference between $n_f$ and $n_c$, the smaller the angle $\alpha$, or, when it applies, the larger the leaky mode reflection coefficient of structure 13, the smaller the leakage, the narrower the line width of near to 100% diffraction efficiency. The line width is increased by using a broadband lossy mirror as mirror 12 made of metal as for instance aluminium or silver. Broadening the wavelength range over which the leaky mode dispersion equation is fulfilled can also be achieved by using a layer 4 composed of several sublayers of alternating refractive index and different thicknesses, i.e., by altering the leaky mode dispersion. Another means of increasing the wavelength range $\Delta\lambda$ over which the −1$^{st}$ diffraction order efficiency is large is by using as mirror 12 a multidielectric mirror composed of a large number of layers of alternating low and high refractive index $n_l$ and $n_h$, the refractive index being close to each other and close to the index of layer 4. Multilayer mirror 12 is a chirped mirror, the first alternating layers at the side of layer 4 being "$\lambda/4$" layers for the smaller wavelength of the considered wavelength range $\Delta\lambda$, the last alternating layers at the side of the substrate 14 being "$\lambda/4$" layers for the larger wavelength of the wavelength range $\Delta\lambda$. A layer j of index $n_j$ of the multilayer 12 is said "$\lambda/4$" for a spectral component of wavelength $\lambda_i$ when its width $w_j$ is given by $w_j = \pi_i(n_j^2 - n_i^2 \sin^2\theta_i)^{-1/2}/4$ where $\theta_i$ is the incidence angle in layer 4. As a result, the beam zig-zagging in layer 4 "sees" always the same electromagnetic width of layer 4 normalized to the wavelength whatever the wavelength in the domain $\Delta\lambda$. It is known that this is at the cost of a decrease of the reflectivity of the multilayer mirror 12. Those familiar with the art will find out the suitable index $n_l$ and $n_h$ of the multilayer and the suitable chirp rate allowing $\phi$ to vary with the wavelength so that the characteristic equation is substantially satisfied for every wavelength in the range $\Delta\lambda$ by using a multilayer code. A chirped multilayer mirror 12 can also modify the sign of the dispersion as disclosed in document N. Matuschek, F. X. Kartner, U. Keller, "Theory of double-chirped mirrors", IEEE J. Selected Topics in Quantum Electronics, Vol. 4, pp. 197-208, 1998.

The present device is useful for optical processing applications such as pulse stretching and compression where a prescribed wavelength dependence of the phase of the −1$^{st}$ order diffracted beam is required.

These seven structural embodiments can be combined between each other and they can be combined with the four configurational embodiments a), b), c) and d).

The diffraction efficiency in a given structure under given incidence and diffraction conditions is mainly governed by the depth of the grooves of the local grating of the diffractive element 8. In the condition of grazing incidence ($\alpha < 10$ degrees) it is possible to derive an analytical formula giving the depth $\sigma$ of a sinusoidal grating from the modelling of the accumulation/diffraction phenomenon described above with the −1$^{st}$ order off the incidence plane.

Figure 9:
FIG. 9 is a symbolic representation of the search procedure for the operation conditions of a device of the invention

The search for the condition of high or 100% diffraction efficiency is made by means of a grating solver code available commercially, for instance Gsolver. However, use can be made of an analytical solution for grazing incidence to quickly converge towards the solution requested in a defined opto-geometrical situation and a definite structure. The problem is to find out a couple of $\{H_f, \sigma_f\}$ values for the film thickness H and for the grating depth $\sigma$ in the (H,$\sigma$) plane providing high or close to 100% diffraction efficiency under given incidence conditions, desired diffraction conditions, and in a structure by its mirror and the layer on top of the latter. The search procedure is illustrated in FIG. 9.

The beginning of the search can be preferably made with $\alpha$ very close to zero in which case the required depth $\sigma$ is close to zero which means that the starting points of the search are almost located on the $\sigma=0$ axis. These are the points where the condition for the excitation of a leaky mode of the layer is satisfied. These points $H_m$ where m is the order of the leaky mode of a given polarization are given analytically by the condition given in U.S. Pat. No. 6,219,478 B1:

$$kH(n_f^2 - n_c^2 \cos^2 \alpha)^{1/2} = m = m_{lm} - \phi/2$$

where $\phi$ is the reflection phaseshift of the leaky mode of order $m_{lm}$ at the lower mirror 12. This expression is explicitely completed here by the term $-\phi_c/2$ in the right hand term, $\phi_c$ being the reflection phase shift of the leaky mode at the upper semi-reflective structure 13. In FIG. 9 the first order leaky mode, $m_{lm}=1$, is considered as an example. The search procedure starts at $H_1$ with $\alpha$ close to zero. If an analytical formula for grazing incidence is available, the search procedure can start at point $\{H_1, \sigma_s\}$ where $\sigma_s$ is given by the analytical formula for a non-zero angle $\alpha$ which speeds up the search procedure.

As from point $\{H_1, 0\}$ or $\{H_1, \sigma_s\}$, the angle of incidence $\alpha$ is increased stepwise towards the imposed value. At each step of $\alpha, \beta$ is incremented towards its target value along a path in the (H,$\sigma$) plane where the single propagating −1$^{st}$ order condition is fulfilled, and the $\{H_f, \sigma_f\}$ point for 100% efficiency is found. The converging stepwise procedure is pursued up to the point $\{H_f, \sigma_f\}$ where the targeted $\alpha$ and $\beta$ values have been reached with 100% efficiency. Note that the points on the search path where diffractive structure 8 excites guided modes of the layer or of the reflective structures 12 or/and 13 if the latter are made of a dielectric multilayer must be considered with special care as described in the 6$^{th}$ structural embodiment where resonant reflection due to waveguide mode coupling is used or as described in the second application embodiment. The points where the diffractive structure 8 excites a plasmon mode of reflective structure 12 and/or 13 if the latter comprises a metal-dielectric interface must also be treated with care as described for instance in the second applicative embodiment where the presence of guided and/or plasmon modes gives rise to possibly useful dips in the diffraction efficiency spectrum. Another and more phenomenological way of finding the conditions for high, possibly 100% diffraction efficiency for the $-1^{st}$ order can be used by those familiar with the art of waveguide resonances; it is particularly useful in cases where reflective structures 12 and/or 13 are dielectric multilayers, reflective structure having a transmission equal or close to zero for the leaky mode 22. In this multilayer case, the number of optimisation variables is quite large and resort is made to the teachings of U.S. Pat. No. 6,219,478 as to the phenomenological representation of the high efficiency resonant diffraction mechanism. The necessary condition to be satisfied for the achievement of large diffraction efficiency for the $-1^{st}$ order is the resonance condition for at least one leaky mode of layer 4. Reflective structures 12 and/or 13 are first designed so as to fulfil this resonance condition. This amounts to satisfying the leaky mode dispersion equation where H is the mean height of the corrugated layer 4. Once this condition is satisfied, the depth of the diffractive structure (or the index modulation amplitude) which provokes the cancellation of the Fresnel reflection is determined. It is not always possible to cancel the Fresnel reflection. There must be a balance between the field strength of the leaky mode and the strength of the grating. For instance, a strong field accumulation in the leaky mode (as achieved by means of grazing incidence or by the presence of a high reflectivity semi-reflective structure 13) and a weak grating of too shallow groove depth would not permit the cancellation of the Fresnel reflection since the contribution of the leaky mode leakage to the Fresnel reflection would dominate the contribution of the direct reflection from the top of layer 4. Consequently, the grating must be strong enough to diffract the incident field while it is trapped in the leaky mode. A quantitative criterion for obtaining a balance between the leaky mode field strength and the grating strength is given by stating that the leakage rate $\alpha_l$ of the leaky mode field into the cover medium is essentially equal to or smaller than the radiation rate $\alpha_r$ of the leaky mode field into the cover medium due to the sole $-1^{st}$ diffraction order of the grating ($\alpha_l$ and $\alpha_r$ are the field decay coefficients of the leaky mode field as expressed as $\exp(-\alpha_l x)$ and $\exp(-\alpha_r x)$ where x is the abscissa along the leaky mode propagation direction). For the grating strength to be large without the grating depth to be large, the corrugation or the index modulation is placed where the leaky mode field is large. For instance, a corrugation for a TE-polarized leaky mode is preferably not placed at a metal surface next to layer 4 since the TE modal field at a metal surface is close to zero. Those familiar with guided mode resonances know that the surface or index modulation should preferably be placed in the modal field lobes. As another example, the corrugation is preferably not placed at the interface between layer 4 and cover medium 15 if $n_f > n_c$ and if the leaky mode is TM polarized.

Situations where the diffraction angle $\in_f$ also corresponds to a leaky mode of layer 4 is a useful particular case where the diffractive structure 8 couples resonantly the two leaky modes to each other; high and possibly 100% diffraction efficiency can also be obtained in this situation provided reflective structure 12 has essentially zero transmission for both leaky modes. The diffracted leaky mode excited by the diffraction of leaky mode 22 by grating 8 can be a leaky mode, propagating in the direction given by angle γ differing from π, of the same or of different order, and of the same or of different polarization (in the collinear configuration (β=0), polarization conversion is achieved between two leaky modes in the presence of a periodic electro- or magnetooptic effect in layer 4). When the diffraction angle $\in_f$ corresponds to a leaky mode of layer 4, the operation principle of the device of the invention is completed by the action of the diffracted leaky mode. As in the case where the angle $\in_f$ does not correspond to a leaky mode, the field leakage of the leaky mode 22 into the cover medium 15 still tends to destructively interfere with the wave directly reflected at the side 100 of layer 4; grating 8 still diffracts according to its reflected $-1^{st}$ order a diffracted beam into the cover medium 15 under angle sc; grating 8 still diffracts according to its transmitted $-1^{st}$ order a diffracted beam towards reflective structure 12 under the angle $\in_f$ in layer 4 where it is now partially trapped in the form of a leaky mode instead of being directly reflected into cover medium 15; this diffracted leaky mode now leaks into the cover medium 15 similarly to how leaky mode 22 leaks in the Fresnel reflection direction; however, the direction in which the diffracted leaky mode leaks into the cover medium 15 is the direction of the diffracted beam 24; this cascaded diffraction process whereby grating 8 couples leaky mode 22 to the diffracted leaky mode which in turn leaks in the direction of diffracted beam 24 can lead to an enhancement of the effective strength of grating 8 and can lead to close to 100% diffraction efficiency over a broad optical frequency band. This property can have a number of applications, one of them being described in applicative embodiment number 2. Diffraction outside the incidence plane (β is non-zero) is generally accompanied by polarization coupling; if the diffracted leaky mode resonance condition is polarization dependent, only one of the coupled linear polarizations of the $-1^{st}$ order beam diffracted towards the substrate corresponds to a leaky mode. The device of the invention achieves theoretically a complete extinction of the Fresnel reflection, therefore 100% diffraction efficiency. In practice however, the achieved efficiency is only close to 100%, for instance 95%, and there are a number of cases where the diffraction efficiency is notably smaller than 100%, for instance 50% or even less which remains high as compared with the diffraction efficiency of the same diffractive element in the absence of the leaky mode 22 and of the semi-reflective structure 13. Such case is for instance when the reflective structure 12 is imperfectly reflective for the leaky mode 22 and/or for the transmitted $-1^{st}$ order 23 as in the $5^{th}$ structural embodiment. Another case is when layer 4 is made of a lossy or scattering material. Another case is in configurational embodiment c) when the weak corrugation or weak index modulation is imperfectly sinusoidal. Another case is when the diffractive structure 8 exhibits so weak a corrugation or so weak an index modulation (as for instance in periodically modulated UV-photoimprinted silica films, periodically modulated electrooptical or magnetooptical effects, or surface acoustic wave index and surface modulation) that the field accumulation in leaky mode 22 is practically not sufficient to give rise to close to 100% diffraction efficiency, yet the efficiency is orders of magnitude higher than in the absence of leaky mode 22 and of semi-reflective structure 13.

As from here 22 application embodiments of the present invention will be described.

Figure 10A:
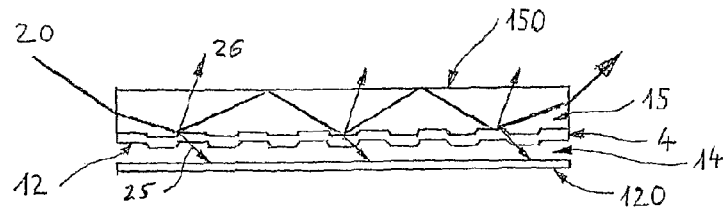
FIG. 10a) is a cross-sectional view in a plane parallel to the incidence plane.
Figure 10B:
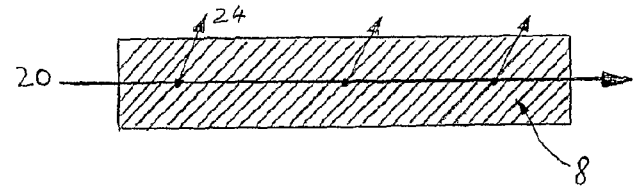
FIG. 10b) is a top view.

FIG. 10 represents a first applicative embodiment defining a notch filter where the large spectral range incident beam propagates in an incident medium 15 whose refractive index $n_c$ is larger than the refractive index $n_s$ of the medium of substrate 14. The incidence angle α in the incidence medium 15 is smaller than the critical angle between the incidence and substrate media: $\cos \alpha > n_s/n_c$. The substrate material of index $n_s$ can for instance simply be air, mirror 12 of 100% reflection being the interface between layer 4 and substrate 14. In a notch filter application the spectral lines of the incident beam not satisfying the leaky mode resonance are substantially 100% reflected in the direction of the Fresnel reflection. The $-1^{st}$ diffracted order corresponds to the wavelength which must be filtered out from the incoming beam. The $-1^{st}$ diffracted order needs not be collected; it is the rest of the spectrum which interests the user as in fluorescence spectroscopy; therefore, the $-1^{st}$ diffracted order leaks preferably into the substrate and incidence media 14 and 15 in the form of $-1^{st}$ order diffracted waves 25 and 26. A larger rejection of the undesired spectral line is obtained by cascading more than one diffraction event by total reflection of the incident beam on the top face 150 of the cover 15 as illustrated in FIG. 10a showing a cross-section parallel to the plane of incidence. FIG. 10b is the top view of grating 8. The filter line width is controlled by the reflection coefficient of semi-reflective structure 13 and by the loss of mirror 12 and semi-reflective structure 13.

In a further applicative embodiment related with the previous application, the $-1^{st}$ diffracted order 25 directed towards the substrate is collected by means of a mirror 120 placed at a distance from the dioptre formed by layer 4 and the substrate medium 14 where the evanescent field of the leaky mode does not "see" mirror 120. The distance is adjusted so that the $-1^{st}$ order 25 diffracted into the substrate 14, then reflected by mirror 120 interfers constructively in the cover medium with the $-1^{st}$ order 26 diffracted directly into the cover medium to form the $-1^{st}$ order beam 24 diffracted in reflection by the device of the invention.

The $-1^{st}$ order 25 can also be totally reflected at the layer/substrate dioptre if the diffraction angle $\in_c$ is larger than $\arcsin(n_s/n_c)$. This is achieved by means of a grating 8 of large period whose $K_g$-vector points close to the circle of radius $n_c k$ in the $(k_x, k_y)$ reciprocal plane of FIG. 3. FIG. 10 illustrates more generally that the field of the $-1^{st}$ order diffracted beam 24 is the sum of the field of the wave 26 diffracted directly into the cover medium 15 and of the field of the transmitted diffracted wave 23 reflected into the cover by structure 12.

Figure 11:
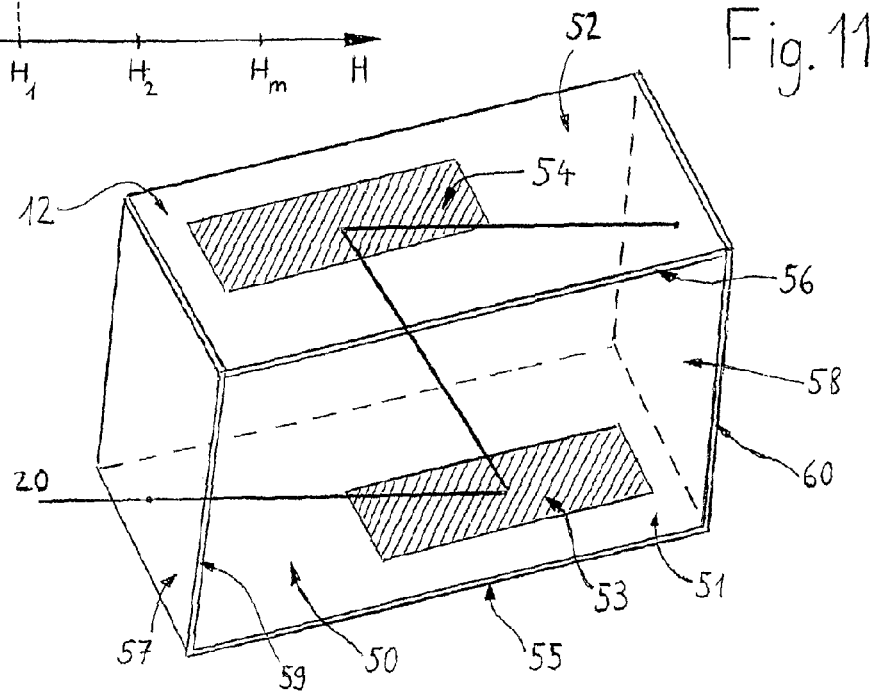
FIG. 11 is the perspective view of a two grating element corresponding to a second, a third, a fourth applicative embodiments

FIG. 11 is the perspective view of a dual-grating element where the reflecting structure 12 is a total reflection dioptre for both the incident and $-1^{st}$ order diffracted beams. This second applicative embodiment of the invention is particularly suitable for pulse stretching, pulse compression and more generally dispersion compensation applications. A block 50 of homogeneous transparent material has two parallel faces 51 and 52 with two identical corrugation 53 and 54 on which two identical leaky mode propagating dielectric layers 55 and 56 of equal thickness and refractive index are deposited. The material of block 50 can be fused quartz and the material of layers 55 and 56 can be PECVD silicon oxynitride SiON or sputtered $HfO_2$. In UV applications, the material of block 50 can be calcium fluoride or $MgF_2$ or fused quartz and the material of layers 55 and 56 can be $Al_2O_3$ or $LaF_3$. Both end faces 57 and 58 of block 50 are parallel and polished. The input face 57 has an antireflection coating 59. The output face 58 has a mirror 60. In cases where the fluence of the compressed pulses is too large, the block 50 of transparent material is replaced by air or vacuum. In this second applicative embodiment to a femtosecond pulse compression device, the wavelength domain over which high diffraction efficiency is high must usually be wide to enable a large compression ratio; this is obtained for instance by using a structure 13 of not too large reflectivity and/or a silver mirror 12. Using a diffraction configuration with the diffracted beam outside the incidence plane gives more flexibility in the system design, especially in systems using two parallel gratings where the diffracted order must not be returned parallel to itself as in pulse compression and stretching systems; this broadens the choice of possible configurations exhibiting high efficiency and broad band diffraction; in particular, the $-1^{st}$ order diffracted beam directed towards substrate medium 12 under angle $\in_f$ can correspond to a leaky mode propagating in a direction $\gamma$ non-equal to $\pi$ in the (x,y) plane if $\beta$ is non-zero. The diffracted leaky mode can be of the same order as leaky mode 22 or of different order; it can be of the same polarization as that of leaky mode 22 or of different polarization. If the diffracted leaky mode condition is polarization dependent, only one of the TE or TM polarizations of the diffracted beam correspond to the diffracted leaky mode. A useful particular case is the diffracted leaky mode being of the same order and polarization as leaky mode 22 and $\beta$ being non-zero and relatively small, for instance 5 degrees, and $\in_c$ being equal to $\theta_c$; in this configuration, diffracted beam 24 essentially exhibits the same diffraction characteristics as under the $-1^{st}$ order Littrow configuration (high diffraction efficiency over a relatively wide band) while being diffracted in a direction which is not parallel to the incident beam 20.

The spectral dependence of the $-1^{st}$ order diffraction efficiency usually exhibits a maximum and falls as the wavelength deviates from the synchronism wavelength of leaky mode excitation. The device of the invention also allows the wavelength dependence of the diffraction efficiency to be spectrally taylored and exhibit one or more maxima in the wavelength region of leaky mode excitation. This is achieved by having grating 8 to excite a waveguide mode of layer 4, or a waveguide or plasmon mode of reflective structures 12 and/or 13. The excitation of a waveguide or plasmon mode by grating 8 simultaneously to the excitation of a leaky mode by refraction into layer 4 usually shows as a dip in the diffraction efficiency spectrum. Creating one or more dips in the complex diffraction efficiency curve is one way of shaping the temporal profile of femtosecond pulses. The excitation of a waveguide or plasmon mode of effective index $n_e$ larger than $n_c$ (this can only take place when $n_c < n_f$ and $n_e$ is comprised between $n_f$ and $n_c$) by means of a grating 8 of spatial frequency $K_g$ obeys the relationship $kn_e = K_g + -kn_c \cos \alpha$.

A third applicative embodiment is a device similar to that of the embodiment of FIG. 11 performing as a polarisation independent notch filter where the layer 55 and grating 53 diffract the TE polarisation of a spectral line of the incident beam, and layer 56 and grating 54 diffract the TM polarisation of the same spectral line of the beam reflected at the first diffraction event. A cascade of identical pairs of diffraction events increases the damping of the spectral line to be filtered out without inducing a significant loss on the rest of the spectrum. In all notch filter applications the spectral width of the diffracted beam 24 is determined by the overall losses of the leaky mode. Narrow spectral width is obtained by using non-metallic reflective structures 12 and grazing incidence, or any incidence angle with a high reflection semi-reflective structure 13. Large spectral width is obtained, as for a UV or IR blocking filter for instance, by using a metallic mirror 12 and/or, non-grazing incidence.

A fourth applicative embodiment is the device represented by FIG. 11 and used as a dispersion compensator. In communication applications for instance, the group delay dependence on the wavelength in a communication line must be compensated for by an element introducing a wavelength group delay dependence of opposite sign in order to reduce chromatic dispersion. This fourth applicative embodiment is particularly advantageous since a close to 100% diffraction efficiency represents a quasi-lossless element. Note that the above condition can be modified to account for material dispersion in case the space between gratings 53 and 54 is filled with an optical material. The same device can be used more generally in a laser cavity or in a Fabry-Perot filter to create a desired wavelength dependence of the free spectral range.

Another condition can be obtained on the diffraction conditions and on the parameters of the device to be used as a dispersion compensation element aimed at providing a chromatic dispersion opposite to that caused by an upstream dispersive communication link for instance as described in the second applicative embodiment. The device of the invention can compensate large chromatic dispersion without being unduly large because it provides large diffraction efficiency in configurations exhibiting large dispersion.

Figure 12:
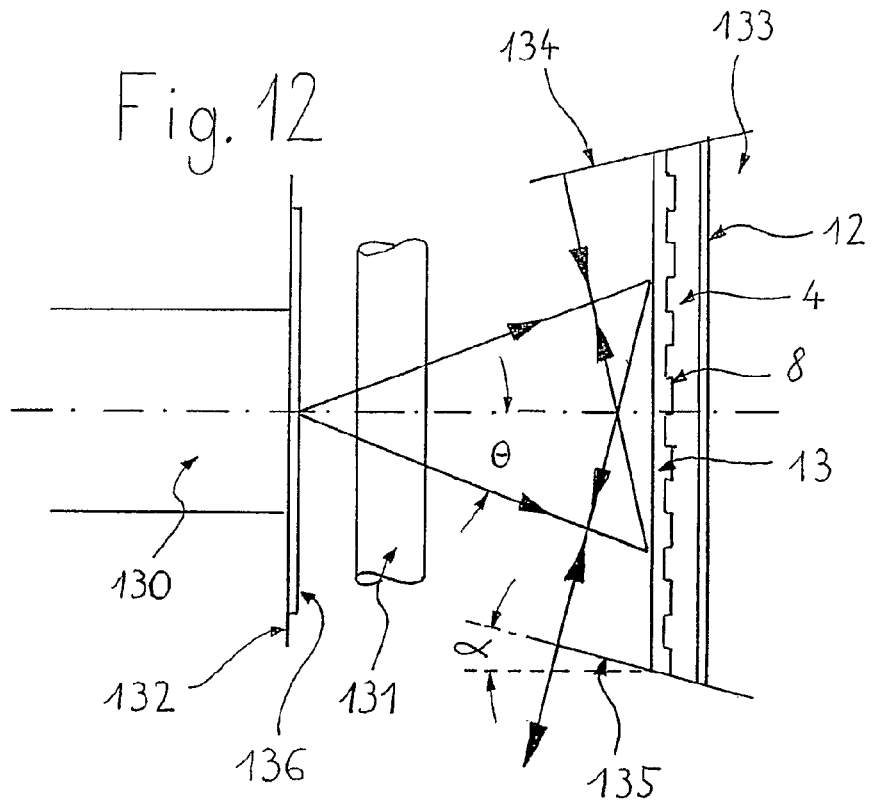
FIG. 12 is a top view of a $5^{th}$ applicative embodiment of the device of the invention as a laser mirror

A $5^{th}$ applicative embodiment of the invention defines a wavelength and angularly selective external mirror of a high power semiconductor laser rendering the high power laser single transverse mode. The high power semiconductor laser can be a wide stripe laser or a semiconductor laser array comprising a number of neighbouring emitters, or a set of wide stripe lasers placed side by side. FIG. 12 represents the simple case of a single wide stripe high power laser. It is known from document by J.-M. Verdiell, R. Frey, "A broad-area mode-coupling model for multiple-stripe semiconductor lasers", IEEE J. Quantum Electronics, Vol. 26, 1990, pp. 270-279, that the emission of a wide stripe semiconductor laser consists of a number of transverse modes. The power distribution between the transverse modes depends on the injection current and on the nonlinear property of filamentation of the wide stripe junction. The simultaneous emission of several transverse modes translates into a low spatial coherence field which comprises an unstable number of lobes of fluctuating amplitude. An external mirror whose normal makes an angle θ of about 8 degrees with the wide stripe optical axis as reported in U.S. Pat. No. 4,905,252 or in document by V. Raab, R. Menzel, "External resonator design for high-power laser diodes that yields 400 mW of $TEM_{00}$ power", Optics Letters Vol. 27, 2002, pp. 167-169, enhances the feedback of the transverse mode(s) having the largest amplification in the wide laser stripe. A conventional mirror does not provide enough angular and wavelength selectivity. But this device of the invention provides the necessary selectivity and allows a particularly simple and compact geometrical arrangement. The emission of the wide stripe laser 130 is collimated by a cylindrical lens 131 parallel to the wide stripe facet 132 coated with antireflection multilayer 136. The device according to this applicative embodiment has its normal substantially parallel to the wide stripe optical axis. Layer 4, diffraction grating 8, highly reflective structure 12 and semi-reflective structure 13 are located at the laser side of a substrate 133. Substrate 133 also comprises two side mirrors 134 and 135 making an angle α with the normal to the substrate surface. Mirrors 134 and 135 are usual multilayer mirrors exhibiting high reflectivity in the gain bandwidth of the semiconductor laser. Mirror 134 has close to 100% reflectivity and mirror 135 has a lower reflectivity if the laser output is through mirror 135. They both have close to 100% reflectivity if the laser output is at the opposite facet of the laser wide stripe. α is preferably small so as to achieve the best mixing of the beams emitted by a single wide stripe, and also the best overlap of the beams emitted by an array of neighbouring laser stripes. The thickness H of layer 4 is chosen so that a beam of incidence angle α excites a leaky mode of layer 4. The leaky mode is of TM polarization if the laser emission is TE polarized. The presence of the semi-reflective structure 13 is necessary to increase the wavelength and angular selectivity especially in the case of a TM leaky mode. The relationship between angles θ,α, the wavelength λ and the grating period Λ is cos α+sin θ=λ/Λ. This external mirror configuration is particularly advantageous as the mirror is placed close to the high power laser facet, leading to a particularly compact device.

Figure 13:
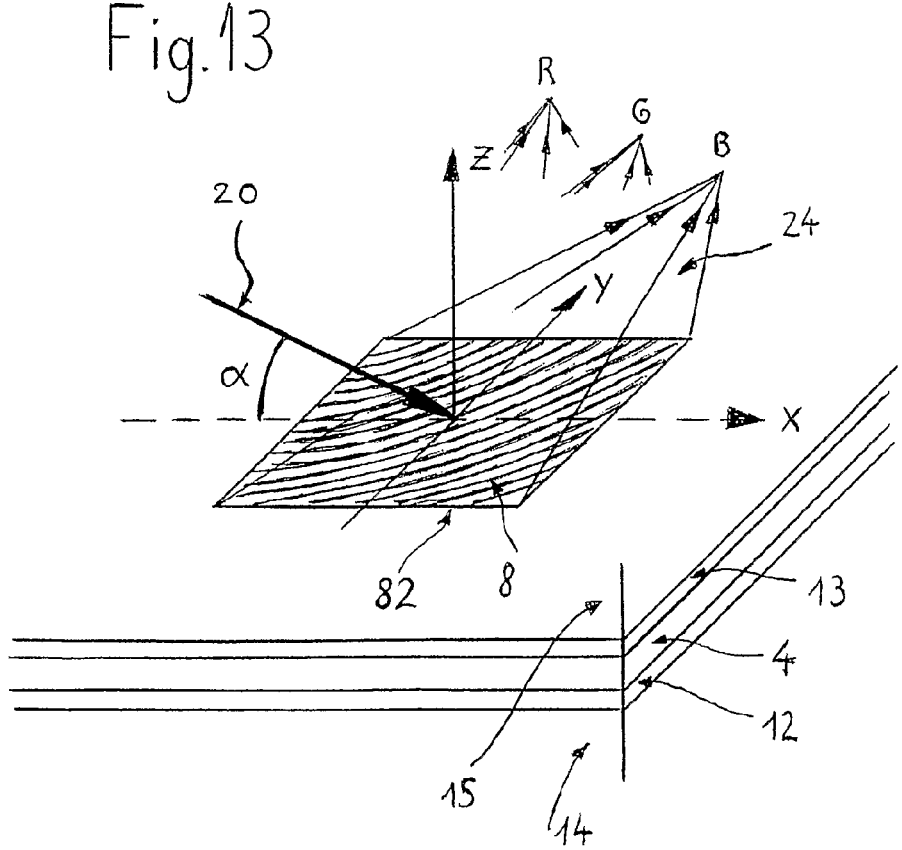
FIG. 13 is the perspective view of a $6^{th}$ applicative embodiment to a colour separation device

A $6^{th}$ applicative embodiment of the invention is a high efficiency off-axis diffractive lens illustrated in FIG. 13. A collimated incident beam 20 impinges on a locally periodical, focusing diffractive optical element (DOE) 8 according to the invention. The incident beam 20 needs not be collimated. The thickness of layer 4 is substantially constant. The local $K_g$-vector varies across the area 82 of the DOE so as to focus all diffracted waves emitted from area 82 to the focus located in the cover medium 15 which can be air. The focus may be located outside the incidence plane to permit the use of an easily fabricable, and nevertheless substantially 100% efficient, large local grating period according to configurational embodiments a), b) or c).

As shown in FIG. 13, the present embodiment can be a colour separation device according to the invention comprising a multimode layer 4 exhibiting leaky mode resonances for the R, G and B components or any other group of colours of the spectrum as explained in a further section concerning the $8^{th}$ applicative embodiment. The diffractive element 8 has curved lines to diffract and focus the different spectral components of the incoming beam 20 to different points R, G, B where detectors are placed. The advantages of this device is that the local period of the diffractive element need not be very small since the configurational embodiments b) or c) can be used, and there will be no spurious diffraction orders, all optical field of each component being focused on a single point in the three dimension space. If configurational embodiment b) is used, a simple binary DOE achieves high efficiency.

A variation of the $6^{th}$ applicative embodiment is as an axicon as described in documents J. H. McLeod, J. Opt. Soc. Am., Vol. 44, P. 592, 1954, and as reviewed by Z. Jaroszewicz, A. Burvall, A. T. Friberg, "Axicon—the most important optical element", Optics & Photonics News, April 2005, pp. 34-39, where a preferably monochromatic collimated wave impinges under preferably close to normal incidence on a grating 8 formed of essentially circular lines of essentially constant radial period, the reflected diffracted beam being an interference pattern (Bessel beam) of essentially circular rings, the central peak of close to normal direction being prevented from spreading along a focal segment. Any direction can be considered for the incident and diffracted beams, grating 8 of adequate non-intersecting lines of closed contour transforming by $-1^{st}$ order diffraction the incident beam 20 into the needed diffracted interferogramme 24. High efficiency is provided by using configurational embodiments a), b) or c) depending on the number of diffraction orders which can propagate.

A $7^{th}$ applicative embodiment of the invention is a DOE of the Fourier or Fresnel types phase- or frequency-encoded onto a high spatial frequency carrier as proposed in document E. Noponen, J. Turunen, "Binary high-frequency-carrier diffractive optical elements: electromagnetic theory", J. Opt. Soc. Am, A11, 1994, pp. 1097-1109. The advantage of such encoding technique is to confer high diffraction efficiency to DOEs which usually exhibit low efficiency because of the large number of unused diffraction orders and because multilevel surface features are difficult and expensive to fabricate. Configurational embodiment a) of the invention enables the optical function of a DOE encoded on the high spatial frequency $K_g$ of a grating in the form of a phase modulation of $K_g$ to be diffracted within or off the incident plane with substantially 100% efficiency, the groove profile being a simple binary profile. Single order diffraction by means of a high spatial frequency carrier requires short periods which may be expensive to fabricate over large areas. The device according to configurational embodiments b) and c) of the invention allows high efficiency DOE generation by encoding the DOE on a carrier of not too high spatial frequency by using a diffraction direction within or off the incidence plane, and a large local period for the high spatial frequency carrier. This device allows the fabrication of large area DOEs of high efficiency by conventional and low cost lithography techniques. If this fifth applicative embodiment is realised according to embodiments a) or b), it gives rise to high efficiency DOEs by means of a binary technology as illustrated as an example in FIG. 14 showing the cross-section of a binary frequency encoded high spatial carrier.

An $8^{th}$ applicative embodiment comprises a diffractive element whose spatial frequency spectrum contains two spatial frequencies. FIG. 15 illustrates one possible structure of a digitized dual-frequency grating 8 with the two spatial frequencies $K_{g1}=2\pi/\Lambda_1$ and $K_{g2}=2\pi/\Lambda_2$, $\Lambda_1$ and $\Lambda_2$ being the two spatial periods of the grating. It can be used as a beam splitter under substantially monochromatic incidence. The double spatial frequency structure need not be binary as shown in FIG. 15; it can also be made by successive exposures in a photoresist film of two interferograms of different period followed by dry etching. It can be used as an optically variable device giving rise to visual Moiré effects when the device is tilted.

The spatial frequency spectrum can contain more than two spatial frequencies; in particular, it can contain a continuum of spatial frequencies of any distribution so as to give rise to desired scattering properties from layer 4 by means of the diffractive structure 8 being in this case a shallow surface roughness. Enhanced scattering using the device of the invention can for instance be advantageous in flat panel displays as described for the transmission case in document by T. Okumura, T. Ishikawa, A. Tagaye, K. Koike, "Optical design of liquid crystal display backlighting with highly scattering optical transmission polymers", J. Opt. A: Pure and Appl. Opt., Vol. 5, 2003, pp. 5269-5275.

FIG. 16 is the cross-sectional view of a $9^{th}$ applicative embodiment of the invention used for the backlight illumination of a liquid crystal panel 71 (LCP). The back plane 72 comprises a finite thickness cover 15, a layer 4, a grating 8 and a mirror 12 preferably made in metal and possibly a semi-reflective structure 13. The grating in FIG. 16 is defined at the interface between the cover 15 and the layer 4. It can also be defined at the mirror side of layer 4 or at both sides of layer 4. An elongated light source 70, for instance a cold cathode fluorescent lamp or an array of LEDs or of optical waveguides, is placed at the edge of the cover 15 and illuminates the cover in the form of beams zig-zagging by total internal reflection between the top side 74 of the cover 15 and the mirror coated corrugated layer 4. The reflection mechanism of the zig-zagging incident beams at the lower side 10 of layer 4 can also be total internal reflection with the material of substrate 14 being of low refractive index, air for instance. The thickness of layer 4 is so large that it exhibits leaky mode resonances for the three fundamental colours Red, Green and Blue (RGB). Layer thickness H, layer index $n_f$ and the order m of the leaky mode resonances in the characteristic equation are selected to obtain leaky mode resonances in layer 4 in the RGB wavelength domains of substantially 460, 540 and 620 nm. Whatever a fixed incidence angle α, if the characteristic equation is satisfied for the R component for leaky mode of order $m_r$, it will be satisfied for the G component for order $m_r+1$, and for the B component for order $m_r+2$, for instance, if $m_r=0$, $m_g=1$ and $m_b=2$. At each impact of the zig-zagging beams onto the corrugated layer 4 the incident beams get diffracted towards the LCP with high efficiency. The period is chosen so as to diffract the R, G and B beams substantially normally to layer 4. The dispersion of the three fundamental colours permits to avoid the use of absorptive colour filters. The period and the line/space ratio of substantially 50/50 are preferably chosen so as to have the operation point in the neighbourhood of normal diffraction according to the second configurational embodiment in the area B of the chart of FIG. 6. A further variation of the same applicative embodiment comprises a low index buffer layer or an air gap 16 between the corrugated layer 4 and the metal mirror 122; this variant relies upon lossless total internal reflection for the leaky mode at side 10 of layer 4 while the $-1^{st}$ order component 25 directed towards substrate 14 is returned towards the LCP by mirror 122. A further variation of the device of FIG. 16 comprises a layer 4 with a continuous graded index profile $n_f(z)$ instead of a constant index $n_f$, the refractive index varying along the direction z normal to the plane of layer 4. As is known by those familiar with integrated optics, a graded index profile leads to a different distribution of mode resonances, for instance, the difference between the values of $n_c f k \cos α$ corresponding to consecutive leaky modes increases with the mode order $m_{lm}$ in the characteristic equation substantially as $m_{lm}^2$ whereas in the case of a parabolic index profile, the values of $n_c k \cos α$ corresponding to the excitation of leaky modes of consecutive orders are substantially equally spaced. Technologies are known in the field of rugate multidielectric filters for achieving arbitrary index profiles by depositing $SiN_x$ with varying x, or co-deposition of $TiO_2$ and $SiO_2$.

A $10^{th}$ applicative embodiment of the invention concerns an integrated free-space optical system obtained by monolithic integration of the optical functions on a single light distribution transparent plate as suggested in document J. Jahns, "Planar Integrated Free-space Optics", Chapter 7, pp. 178-198 of Micro-Optics, Ed. H. P. Herzig, Taylor & Francis, 1997, ISBN 0-7484-0481-3. The incident light beams propagate in the light distribution plate by zig-zagging as in the $9^{th}$ applicative embodiment, and get redirected, split, collimated, focused in two-dimensions by diffractive elements placed at one or at both sides of the transparent plate.

This device of the invention confers to all suggested diffraction devices a high diffraction efficiency within as well as outside the incidence plane by simply adding a low of high refractive index layer 4 to one or to both sides of the light circulation plate, a reflective structure 12 which can simply be the total internal reflection interface between said layer and air outside the plate or a metal layer, the diffractive elements 8 being of the type of previous applicative embodiments depending on the optical function which each diffractive element performs.

This high-efficiency two-dimension light circulation and light processing plate is particularly advantageous for optical interconnects, computer optical backplanes, multichip modules. A similar set of high efficiency diffractive elements according to the invention can be defined for other multifunction monolithic systems such as optical pick up units for data storage or readout applications as described by document T. Shiono, H. Ogawa, "Planar-optic-disk pick up with diffractive micro-optics", Appl. Opt., Vol. 33, 1994, pp. 7350-7355.

FIG. 17 is the top view in the reciprocal space of an $11^{th}$ applicative embodiment related with the $10^{th}$ applicative embodiment and defining a two-grating optical element performing the beam splitting of an incident beam. Splitting an incident beam into two diffracted beams according to configurational embodiment d) of conical diffraction permits a lossless splitting between two diffracted beams of equal power. However, data or clock distribution in a computer interconnection system may require a beam splitting where the diffracted plane is orthogonal to the incidence plane. This is achieved in the present embodiment where the two $K_g$-vectors of two identical gratings placed side by side, the lines of one grating being substantially orthogonal to the lines of the other grating, make an angle β of substantially 45 degrees with the incidence plane which implies that the diffracted angle $\in_c$ is substantially equal to the incidence angle $\theta_i = \pi - \alpha$. When $\alpha < \arccos(n_s/n_c)$ the reflection mechanism at the interface between layer 4 and the substrate medium 14 is that of total internal reflection which implies lossless reflection for the incident and diffracted beams at reflective structure 12. Such beam splitter gives rise to a cascaded computer interconnect backplane, as reported in document by S. J. Walker, J. Jahns, "Optical clock distribution using integrated free-space optics", Optics Communications, Vol. 90, 1992, pp. 359-371. If the incident beam is of the TE polarization, and if the thickness of layer 4 is set for the excitation of a TE leaky mode in the conditions described for the $10^{th}$ applicative embodiment, the diffraction efficiency of the TE diffracted wave is zero whereas the diffraction efficiency of the TM diffracted wave can reach 100% according to the invention. This diffraction event is characterized by a TE to TM polarization conversion. The diffracted TM wave does not correspond to a leaky mode of layer 4. When the TM diffracted wave in turn reaches a next identical grating after a number of totally reflected zigzags, the reciprocal condition applies whereby the incident TM polarization gets diffracted with substantially 100% efficiency into the TE diffracted wave propagating in a plane orthogonal to the incident plane. The cascading of a number of splitting events is performed by a cascade of identical gratings.

Figure 18:
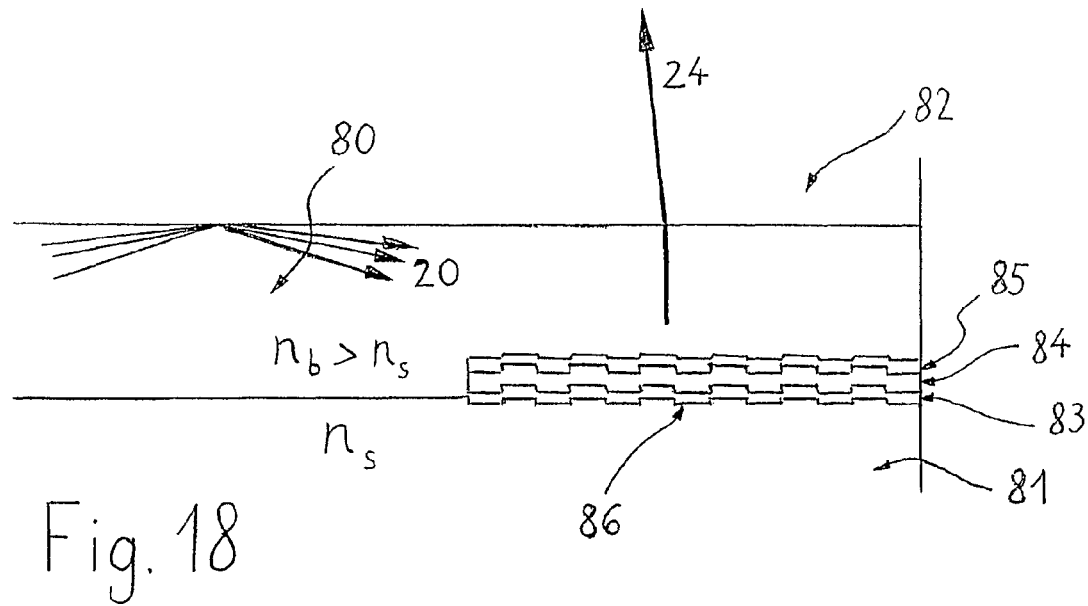
FIG. 18 is the cross-sectional view of a $12^{th}$ applicative embodiment of the device of the invention to an optical interconnect backplane

FIG. 18 illustrates a $12^{th}$ applicative embodiment of the invention performing as an input and output port of an optical backplane. FIG. 18 shows a thick slab multimode optical waveguide 80 of refractive index $n_b$ defined on substrate 81 of index $n_s$ propagating a large number of waveguide modes. Waveguide 80 represents the cover medium 15. The multimode waveguide can also be in the form of a stripe of width larger than the slab thickness. The output port 82 of the optical backplane comprises a mirror 83, a leaky mode propagating layer 84 of index $n_g$ larger than $n_b$, possibly a semi-reflective structure 85, waveguide 80 covering the output port 82. Grating 86 can be made at the surface of mirror 83, in layer 84 or/and in semi-reflective structure 85. All guided modes of waveguide 80 impinge onto layer 84 in the form of waves under a large incidence angle (small angle α). The thickness H of layer 84 is such that most incident guided waves excite at least one leaky mode of said layer. This is possible because the guidance of the waveguide is usually weak, therefore the incidence on layer 84 is essentially grazing, i.e., where the angular acceptance of the leaky mode is particularly large. The grating period and depth, and the semi-reflective layer are chosen so as to diffract with high efficiency in a direction essentially normal to the plane of said layer.

The same device is used in the reciprocal situation as an input port of the optical backplane: an incident beam coming from a computer board impinges in a direction close to normal onto the waveguide loaded diffractive structure of the invention. The diffracted waves coupled into layer 84 leak into the multimode waveguide 80 where they remain guided until they reach an output port.

The same embodiment of an input port can be used for the high efficiency coupling of the pump beam into the cladding of a dual core waveguide or fibre amplifier, the internal doped single mode core propagating the signal to be amplified, the outer core containing the pump beam.

Figure 19A:
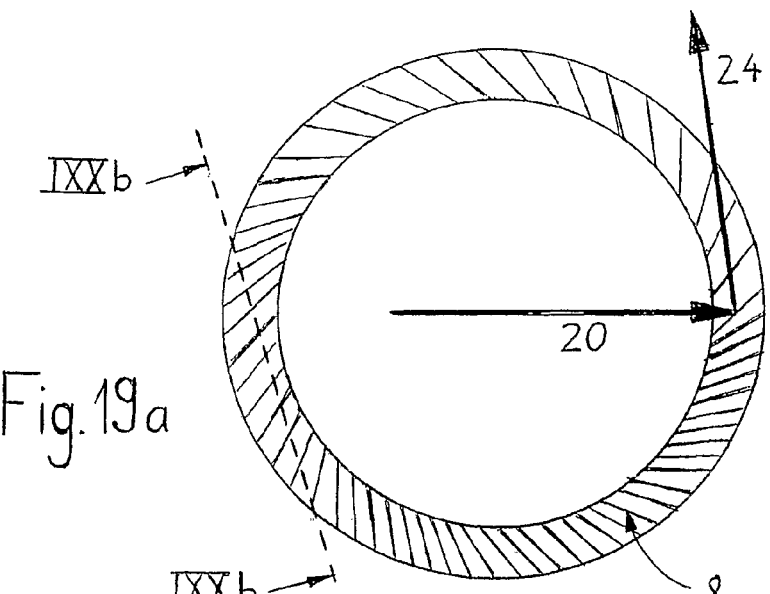
FIG. 19a) is a top view.
Figure 19B:
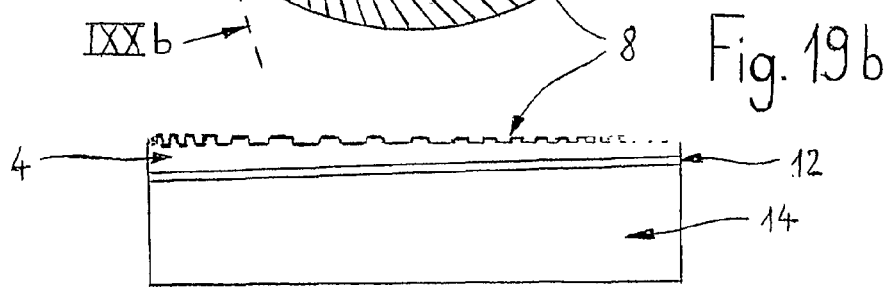
FIG. 19b) is a cross-sectional view in a plane normal to the device surface and containing the gradient of the period

A $13^{th}$ applicative embodiment of the invention is a monochromator grating illustrated in FIG. 19. FIG. 19a is the top view of a circular grating of varying period. FIG. 19b is the side view of the corresponding disk of variable thickness of layer 4 and variable depth of grating 8. Layer 4 is of monotonically varying thickness $H(\xi)$ along abscissa 4 starting with the larger thickness allowing the excitation of the leaky mode of order m for the larger wavelength of the considered spectrum by the substantially collimated white light incident beam 20, and ending with the smaller thickness allowing the excitation of the leaky mode of same order m for the smaller wavelength of the considered spectrum. At each abscissa ξ of the layer of varying thickness the modulus and orientation of the grating $K_g$-vector are such that the $-1^{st}$ diffraction order 24 points in a fixed direction. This condition expressed for the local grating period $\Lambda(\xi)$ is:

$$\Lambda(\xi) = \lambda(\xi)(\cos^2\alpha + \sin^2\in_c - 2\cos\alpha\sin\in_c\cos\gamma)^{-1/2}/n_c$$

and the orientation of the $K_g$-vector at the impact zone of beam 20 is substantially constant and given by $$tg\beta(\xi) = \sin\in_c\sin\gamma/(\cos\alpha - \sin\in_c\cos\gamma)$$

where ξ is the abscissa along the thickness gradient, $\lambda(\xi)$ is the local leaky mode resonance wavelength at abscissa ξ. The grating depth is the same increasing function of the abscissa ξ. The abscissa 4 can be a Cartesian coordinate if the thickness changes along a Cartesian axis; ξ can be a circular abscissa as in FIG. 19 if the thickness change is along the azimuth of a circular coordinate system. A translation or rotation of the diffractive element gives rise to a scan of the diffracted wavelength, the diffracted beam 24 pointing in a constant direction. The gradient of the thickness variation is preferably normal to the plane of incidence. If $K_g$ is in the incidence plane (β=0), $\Lambda(x) = \lambda(x)(\cos\alpha - \sin\in_c)^{-1}/n_c$.

Figure 20:
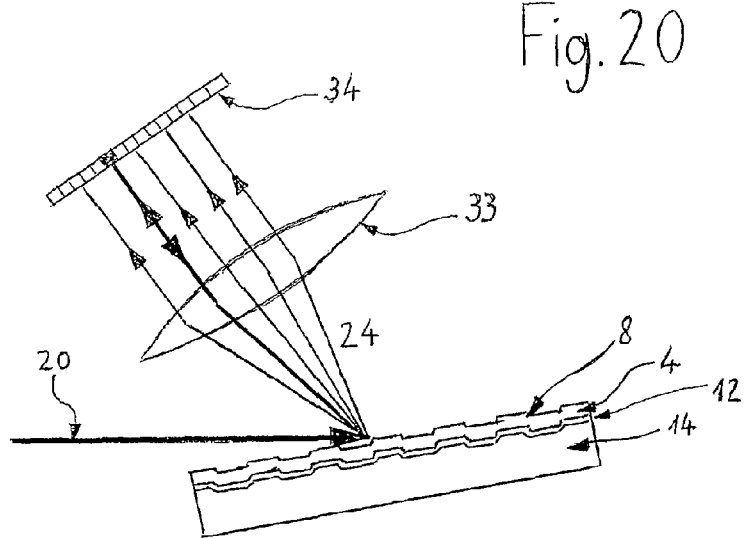
FIG. 20 is the cross-sectional view in a plane parallel to the incidence plane of a $14^{th}$ applicative embodiment of the device of the invention to a tunable multifrequency filter

A $14^{th}$ applicative embodiment of the invention is a comb filter whereby the thickness H of layer 4 is so large as to propagate a large number of leaky modes. A collimated broad band beam 20 excites the leaky modes of layer 4. The characteristic equation defines a comb of optical frequencies $v_j = ck_j/2\pi$ where $k_j$ is the vacuum wave number corresponding to integer number $m_{lm} = j$ in the characteristic equation, all other quantities $n_f$, $n_c$, H being given. There is one comb of frequencies for each polarisation. The two combs are interleaved except when the sum of the phase shift terms ϕ and $\phi_c$ is made polarisation independent modulo 2π. The frequencies $v_j$ of the combs are substantially equally spaced if dispersion is neglected except when the phase shift terms ϕ and $\phi_c$ depend on the wavelength as it is the case with a multidielectric mirror 12. This device can be used as the reflection comb filter for a multifrequency laser in a Littman-Metcalf mounting when a corner cube mirror is placed in the path of the $-1^{st}$ order diffracted beams. FIG. 20 shows that the multifrequency reflector can be made frequency selective by replacing the corner cube by a lens 33 followed by a spatial filter 34 placed in the focal plane of lens 33, for instance a pixellated liquid crystal spatial filter which reflects only the frequency or the frequencies which must lase.

Figure 21:
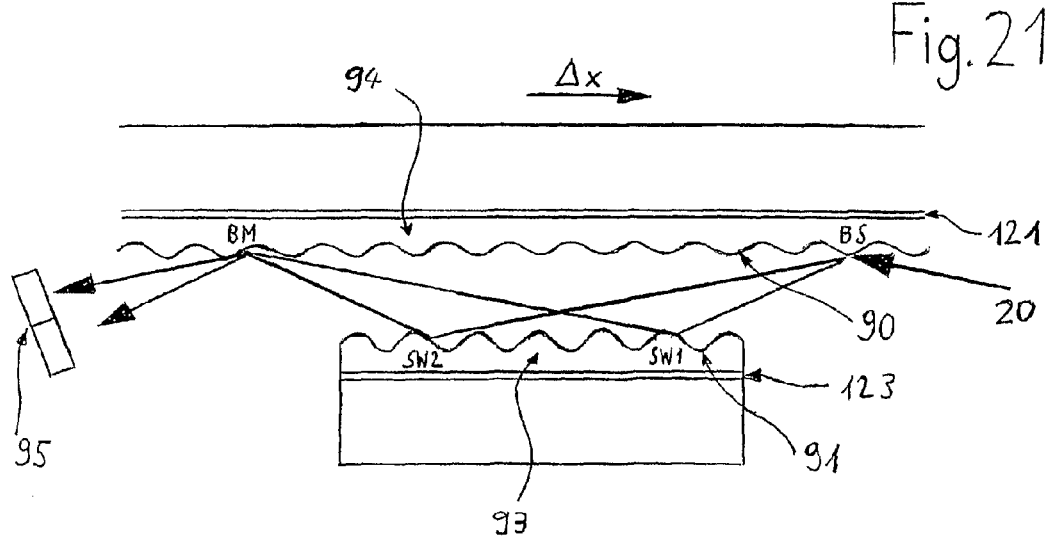
FIG. 21 is the cross-sectional view in a plane parallel to the incidence plane of a $15^{th}$ applicative embodiment of the device of the invention to a displacement sensor

FIG. 21 is the cross-sectional view of a $15^{th}$ applicative embodiment of the invention performing as a displacement sensor and using the property of reciprocity. This $15^{th}$ applicative embodiment preferably uses two gratings according to configuration embodiment b) or c). This device is particularly advantageous because it allows large interference contrast substantially sinusoidal signals in spite of the fact that the period Λ of the scale grating and of the swapping grating are larger, possibly much larger than the wavelength λ. The large period is chosen here to reduce the sensitivity to the yaw between the two gratings. Incident beam 20 impinges on the scale grating 90 made in the leaky mode propagating layer 94 under small angle α. The grating of the invention uses preferably a metal mirror 121 so as to be wide band if a LED source is used and the groove profile is preferably sinusoidal. The depth $\sigma_s$ of grating 90 is so designed that it diffracts equally the $0^{th}$ and $-1^{st}$ orders. As from the first diffraction event BS, called the beam splitting event, the $0^{th}$ and $-1^{st}$ diffraction orders propagate towards the beam swapping grating 91 of sinusoidal profile, of same period Λ, made in the same leaky mode propagating layer 93, having preferably a metal mirror 123, the grating depth $\sigma_r$ being such that the incoming beams are diffracted with substantially 100% efficiency. At the diffractive event SW1 the incoming beam experiences the reciprocal diffraction of 100% by the $+1^{st}$ order. At the diffractive event SW2 the incoming beam experiences a 100% efficiency diffraction by the $-1^{st}$ order. As from the beam diffraction events SW1 and SW2 the two beams propagate towards the $3^{rd}$ diffraction event BM, called the beam mixing event on the scale grating 90 where the two incoming beams are superposed into two output directions where they interfere in the form of two optical power signals which depend sinusoidally and out of phase on the optical phaseshift between the two optical paths accumulated between the mixing diffraction event and the mixing diffraction event. The two interfered optical signals are picked up by a pair of photodetectors 95. This optical field phaseshift Δϕ is known to those familiar with the art to be proportional to the relative displacement Δx between the two gratings parallel to each other. This high efficiency embodiment is also applicable to short period gratings with non-sinusoidal groove according to configurational embodiments a) and b). A displacement sensor according to the invention can also be made with the incidence plane parallel to the lines of gratings 90 and 91 and with the configurational embodiment d).

The next four applicative embodiments concern active devices where the operation conditions of the device of the invention are modified under the effect of an actuation mechanism. The actuation mechanism can act on the leaky mode resonance condition and/or on the diffraction efficiency and diffraction direction.

Figure 22:
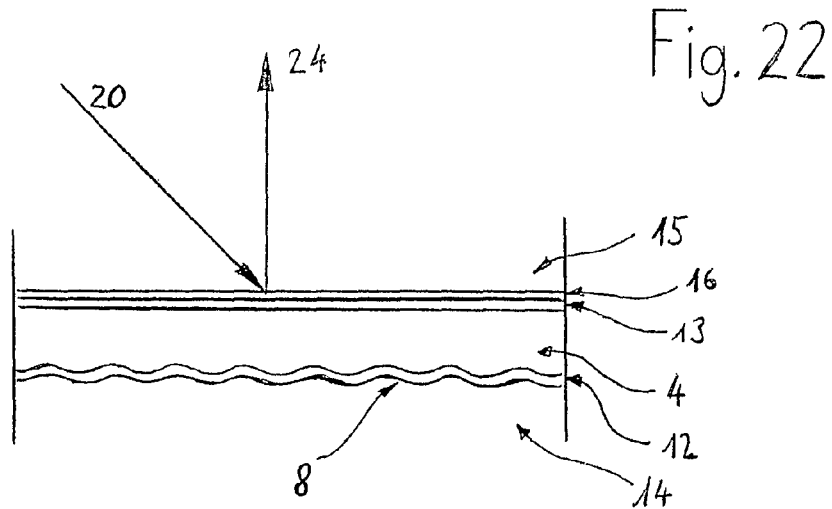
FIG. 22 is the cross-sectional view of a $16^{th}$ applicative embodiment of the device of the invention to liquid crystal light modulator

In a $16^{th}$ applicative embodiment performing as a reflective liquid crystal projector, layer 4 is made of liquid crystal or of a polymer-dispersed liquid crystal. If it is made of liquid crystal, semi-reflective structure 13 is present to increase the reflection at the top side 100 of layer 4 and to allow for the incident beam 20 and for the diffracted beam 24 not to be trapped into the cover material 15 and to be seen by an external observer. It is made on a cover plate comprising a transparent electrode, for instance ITO. The DOE structure 8 is a grating located in the reflective structure 12 preferably made of metal. The grating can also be made in or on the semi-reflective layer 13. The grating can also help the anchoring and orientation of the liquid crystal molecules. If layer 4 is made of a polymer-dispersed liquid crystal as shown in FIG. 22, the thin transparent electrode 16 can be deposited directly on layer 4 as illustrated or it can be combined with semi-reflective structure 13. The operation of the device is the following: as in the $9^{th}$ applicative embodiment, layer 4 has a thickness such that at least 3 leaky modes can propagate, the lower order mode diffracting efficiently the fundamental colour R, the high order mode diffracting efficiently the fundamental colour G and the next higher order mode diffracting efficiently the fundamental colour B. The surface of layer 4 is pixellated with one grating period per pixel of each group of 3 pixels, the grating period in each pixel being chosen so as to diffract the three fundamental colours in the same direction. The mechanism by which the diffraction efficiency is monitored can be liquid crystal scattering which takes place when the liquid crystal molecules are randomly oriented. The application of an increasing electric field between transparent electrode 16 and metallic reflector 12 aligns the liquid crystal molecules parallel to the electric field and the device becomes transparent and diffracts light with increasing efficiency. The advantage of such projection device is the high contrast: in the projection direction there are only the diffracted beams.

This embodiment can also be advantageously applied to variable optical attenuators and dynamic gain equalisers in optical communications.

In another embodiment of the invention also using a polymer-dispersed liquid crystal film 4 a phase grating or a phase hologram 8 is printed in layer 4 by means of holographic exposure; the application of an electric field between transparent electrode 16 and a metallic reflective structure or another electrode placed between reflective structure 12 and substrate 14 changes the average index $n_f$ of the layer 4 and the strength of grating 8, giving rise to a high efficiency dynamic diffractive element. The polymer-dispersed liquid crystal can for instance be that developed by Digilens (www.digilens.com) and described in document L. Domash, G. Crawford, A. Ashmead, R. Smith, M. Popovich, J. Storey, "Holographic PDLC for photonic applications", Proc. SPIE, Vol. 4107, 2000, pp. 1-13. Furthermore, this 16th applicative embodiment can be used in the field of liquid crystals on silicon (LCOS).

A $17^{th}$ applicative embodiment of the invention defines an active device in which layer 4 is made of a material whose refractive index $n_f$ is modified by applying heat through a resistive metallic mirror for instance or by applying an electric field between a transparent electrode 121 and bottom electrode which can be metallic mirror 12, the material of layer 4 being electrooptic such as $LiNbO_3$ or an electrooptic polymer. The change of refractive index $n_f$ changes the wavelength at which the leaky mode characteristic equation is satisfied. Consequently, if the leaky mode resonance is sharp enough, either by using grazing incidence, or by using an angle of incidence close to $\arccos(n_f/n_c)$ when $n_f<n_c$, or by using a high reflectivity semi-reflective structure 13, the diffracted wavelength can be tuned or, if the incidence is at fixed wavelength, the diffracted power is amplitude modulated. Another way of using an electrically controlled electrooptic or magnetooptic effect is in spatially and periodically modulating a diagonal and/or off-diagonal component of the permittivity tensor of layer 4 if layer 4 exhibits such property; whereas the leaky mode condition remains essentially fulfilled, the grating strength, therefore the diffraction efficiency, is modulated by the external electric (or magnetic field in the presence of a magnetooptic effect in layer 4). The presence of semi-reflective structure 13 allows the effect of so weak a modulation to be enhanced by the leaky mode field accumulation.

A $18^{th}$ applicative embodiment of the invention is an active device where layer 4 is made of a material exhibiting a photochromic effect whereby the illumination by light reversibly changes its refractive index as in some organic materials as disclosed in document A. Rodriguez, G. Vitrant, P. A. Chollet, F. Kajzar, "Optical control of an integrated interferometer using a photochromic polymer", Appl. Phys. Lett., Vol. 79, 2001, pp. 461-463. In a first application, grating 8 pre-exists. The illumination is uniform which modifies the refractive index of layer 4, therefore the leaky mode resonance condition. This allows a modulation of the $0^{th}$ and $-1^{st}$ order amplitudes or a switch between them similarly to what a thermal or electro-optical effect would do but with much larger tuning range. In a second application, grating 8 does not exist but is created by the exposure of layer 4 to a structured light in the form of a periodical set of dark and bright lines which create a grating 8 or a DOE in layer 4 giving rise to the possibility of high efficiency dynamic holography. In a further active embodiment layer 4 is made of a photorefractive material.

Figure 23:
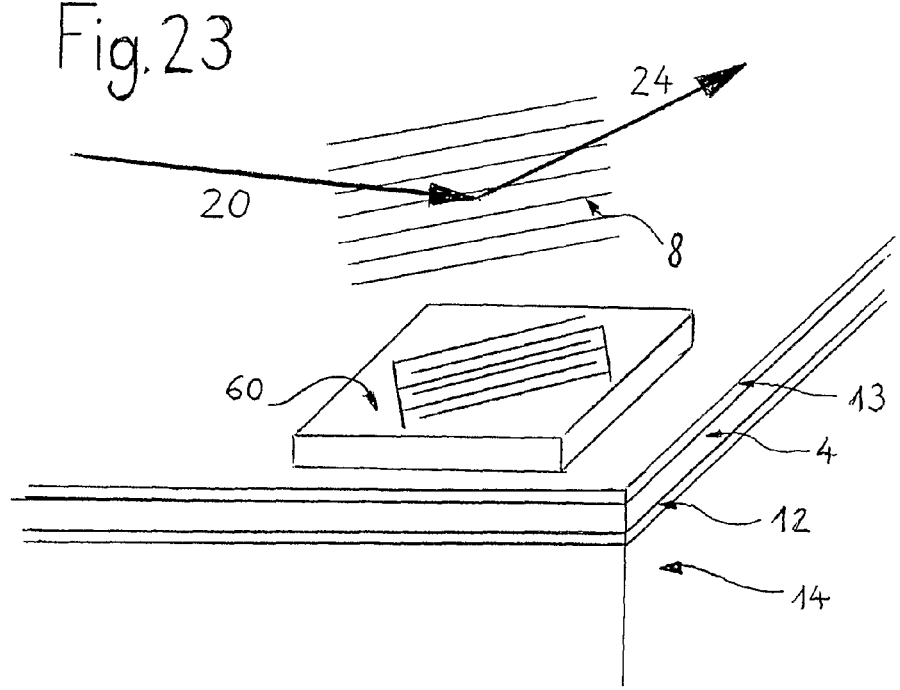
FIG. 23 is the perspective view of a $19^{th}$ applicative embodiment of the device of the invention using a surface acoustic wave

FIG. 23 illustrates a $19^{th}$ applicative embodiment of the invention which uses an optoacoustic device. The reduction of the spatial frequency $K_g$ needed to achieve high diffraction efficiency which the present invention allows with off-plane diffraction and in-plane diffraction with a sinusoidal groove profile permits the use of available techniques for the generation of the shallow surface undulation or of the small index modulation necessary for diffracting the incoming beam with high and possibly 100% efficiency. Surface acoustic waves (SAW) of short spatial period $\Lambda$ can only propagate with low losses over a long propagation length in crystal materials like $LiNbO_3$ or $LiTaO_3$ in which it is difficult to grow or deposite a single crystal layer 4 on top of a mirror like mirror 12 of the invention. The present invention allows to use larger periods for achieving high diffraction efficiency; this permits the use of mirror-based thin films at the surface of which a SAW of lower frequency can propagate a larger distance with lower losses, the SAW being excited by means of a piezoelectric transducer 60. Such layer materials are quartz and many other metal oxides deposited by sputtering, evaporation, chemical vapour deposition. Semi-reflective structure 13 is used to enhance the diffraction efficiency of the weak index and surface modulations which a SAW causes. Large optical field accumulation is needed to increase the diffraction efficiency of the index and corrugation grating created by the SAW and to possibly cancel the zeroth order beam in the Fresnel reflection direction. High diffraction efficiency is obtained by structure 12 having close to 100% reflection for the excited leaky mode 22; in other words, the transmission of incident beam 20 through structure 13, layer 4 and structure 12 in the absence of the SAW is essentially zero under leaky mode excitation. High and possibly close to 100% diffraction efficiency is obtained if structure 12 is also highly reflective for the $-1^{st}$ order and if the diffracted wave is also a leaky mode. A further advantage of using a lower frequency SAW is that the amplitude of the surface undulation increases with the increase of the spatial period (the wavelength) of the SAW. This enables new embodiments for several functional acousto-optical devices such as:

Frequency shifting Bragg cells for free space optical waves. Unlike usual Bragg cells which use bulk acoustic waves and the resulting index modulation in the bulk material, the present invention uses a SAW with a larger diffraction efficiency. Unlike in all-guided acousto-optical interactions, the device according to the invention does not suffer from any constraint of phase matching between the optical and the surface acoustic waves.

Beam steering without mobile parts; similarly to the above mentioned device, the high efficiency diffracted beam can have its direction changed under a change of the acoustic frequency by means of a wide band transducer, or of a set of tilted transducers as it is known for those familiar to the art of acousto-optical interactions. The acoustic power can be adjusted to flatten the efficiency versus the acoustic period. The whole application field of acousto-optical spectrum analysers, correlators can be revisited at the light of the achievability of larger diffraction efficiencies.

Optical frequency tunable sources without mobile parts. Diffraction off the incidence plane allows a variation of the Littman-Metcalf tunable laser mounting. Depending on the acoustic frequency, a different wavelength will be back-reflected into the active medium by the fixed mirror, therefore a different wavelength will lase.

A device of the invention can also be used to efficiently diffract an incident beam by means of a SAW propagating at the surface of a $LiNbO_3$ or $LiTaO_3$ substrate. The incoming beam is incident from the crystal substrate onto the crystal surface where the SAW propagates; it can be a zig-zagging beam propagating in a standard crystal wafer by total internal reflection. The wafer surface where the SAW propagates has experienced ion implantation which has destroyed the crystal structure at some depth H from the surface; the so-created amorphous buffer has a lower refractive index and acts as the semi-reflective structure 13 of possibly high reflectivity if the incidence angle is large and if the buffer thickness is set to the condition of constructive reflection. Reflective structure 12 is the wafer surface where the SAW propagates. High efficiency diffraction of controllable amplitude and tunable angle can be achieved with the optional use of a simple metal mirror to reflect back one of the $-1^{st}$ order beams in the direction of the other one.

Other mechanisms can be used to actively create the corrugation or the index modulation of the diffractive structure 8, or to change its efficiency.

One of the mechanisms is to use a metal coated viscoelastic layer, for instance Sylgard 527 Silicone Dielectric gel (Dow Corning) to produce a periodical modulation of the surface of mirror 12 and of layer 4 as proposed in document H. Kück et al "Deformable micromirror device as phase-modulating high-resolution light valves", Sensors & Actuators A54, 1996, pp. 536-541 or as developed by Okotech (www.okotech.com). The periodic application of an electric field varies the undulation depth of the grating. A transparent dielectric layer 4 deposited on a mirror 12 represents a diffraction device according to the invention where the diffraction efficiency can be varied from 0 to close to 100% efficiency by causing the undulation of the metal mirror 12. If the viscoelastic gel is transparent, it can be used as the material of layer 4 as for instance the gel used by Photonyx Ltd (www-.photonyx.com). The periodical electric field causes a build up of charges at the gel surface provoking surface undulation. It is not easy to give rise to a surface undulation of short period with such viscoelastic materials; however, the undulation profile is quasi-sinusoidal which makes these large period structures useable in the device of the invention according to configurational embodiments c) and d). This embodiment of the device of the invention can be used as a discrete element in optical communications as well as in a pixellated form in displays, TV projectors, imaging systems. The active characteristics of the device makes it electrically controllable, electronically reconfigurable, and especially high efficiency.

A class of new materials exhibiting mechano-optical effects will offer the possibility to reversibly shrink and stretch the spatial period of a grating upon light exposure. Such materials are photosensitive nematic elastomers which produce unusually large strain effects comparable to what is obtainable with thermal strain effects as reported in document by H. Finkelmann, E. Nishikawa, G. Pereira, "A new optomechanical effect in solids", Phys. Rev. Lett., 8701: (1)5501-U74, 2001.

High diffraction efficiency with large periods allows the use of micromachined microsystem technologies for the actuation and the control of the deformation of layer 4 in a periodic manner like for instance the actuation principles for adaptative mirrors or like the principle of movable grating cantilevers of Lightconnect (www.lightconnect.com).

The next three disclosed applicative embodiments are of particularly strong technical and economic interest. They are concerned with light extraction and trapping and characterized by a particularly large angular difference between incident and diffracted beams, one of the beams being angularly close to the normal to the general plane of the device.

Figure 24:
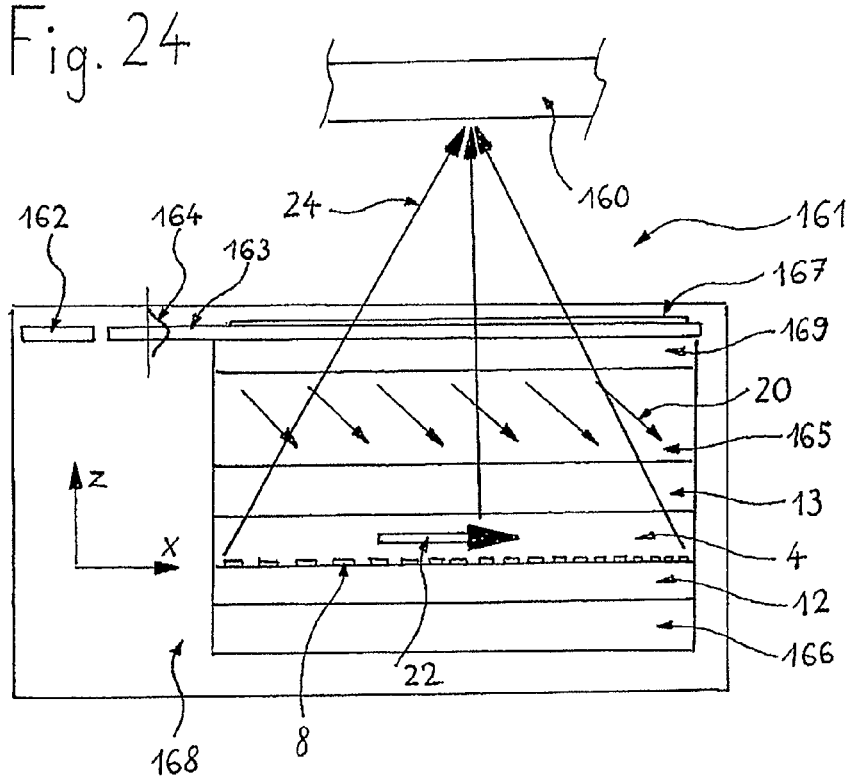
FIG. 24 is the cross-sectional view of a $20^{th}$ applicative embodiment of the device of the invention to a pickup device

The 20$^{th}$ applicative embodiment concerns the domain of light extraction and optical disk pickup read/write heads. In the optical head 168 illustrated in FIG. 24, the light of a semiconductor laser propagating in a plane parallel to the laser junction and parallel to the general plane is extracted from the optical head 168 and directed essentially normally to the general plane and focused onto a disk 160 located in the external half-space 161 with the smallest possible spot size. All existing read/write devices use a moulded or micro-assembled micro-optical module comprising a laser, at least one lens, reflecting surfaces and possible diffractive optical elements. A recent document discloses an integratable miniature system realized by stacked Si-based elements: J.-Y. Chang, C.-M. Wang, C.-C. Lee, H.-F. Shih, M.-L. Wu, "Realization of free-space optical pickup head with stacked Si-based phase elements", IEEE Photonics Tech. Lett., Vol. 17, 2005, pp. 214-216. A document is known which describes a more integrated and monolithic pick up head using an integrated semiconductor laser, a slab waveguide with an outcoupling/focusing grating at its surface A. Larsson, N. Eriksson, S. Kristjansson, P. Modh, M. Uemukai, T. Suhara, H. Nishihara, <<Grating coupled surface emitters: integrated lasers, amplifiers and beam shaping outcouplers >>, Proc. SPIE 3626, 1999, pp. 190-201. Such device is difficult to render efficient. A more integrated pick-up head is described by Dongwoo Suh, Youngwoo Park, Yeungjoon Sohn, Hesuk Jung, Mun Cheol Paek, Kwangyong Kang, "Optimization of leaky mode directional coupler for the application to a small form factor disk pickup", OWTNM'05, 7-9 Apr. 2005, Paper FrB2-5, Grenoble, France.

A device more efficient and more compact than the last one mentioned above is disclosed here whereby the light emitted by a semiconductor laser 162 is first guided into a slab waveguide 163 whose plane is parallel to the laser junction plane and parallel to the general plane. The slab waveguide 163 preferably propagates the sole fundamental mode 164. At some point along the slab a thick layer 165 of refractive index $n_s$ larger than the guided mode effective index $n_e$ is arranged close to the waveguide 163 with a possible low refractive index buffer layer 169 inbetween. The thick high index layer 165 acts as a light sink. It represents the incidence medium 15 of the invention. After some distance along the propagation direction in the waveguide 163, all guided light is coupled out from the waveguide to the light sink by leakage of mode 164 through the optional buffer layer 166 at a leakage rate which is governed by the thickness and index of the buffer. The wave 20 in the light sink is in the form of a free space wave under an incidence angle $\arcsin(n_e/n_s)$ relative to the normal. Next to the light sink layer 165 is a device according to document U.S. Pat. No. 6,219,478. It comprises a grating 8 with a variable period and non-rectilinear and non-parallel line diffractive element extracting the $-1^{st}$ order beam 24 with high efficiency and focusing it to a small spot outside onto a disk 160 situated in the cover medium 161 where the read/write function(s) are performed. The light extraction is preferably performed essentially normally to the general plane; to that end, and for obtaining high and possibly close do 100% extraction efficiency, the diffractive structure 8 is designed according to configurational embodiments b) and c) if the reflection coefficient at the interface between the light sink layer 165 and the leaky mode propagating layer 4 of the device of document U.S. Pat. No. 6,219,478 is not sufficient to cancel out the 0$^{th}$ reflected order over the whole area of the variable period diffractive element 8. In a preferred embodiment, the semi-reflecting structure 13 is a thin layer of refractive index $n_b$ lower than the effective index $n_e$ of the waveguide mode. In a preferred embodiment the leaky mode propagating layer 4 has a refractive index $n_f$ larger than $n_e$. The mirror 12 for reflecting the leaky mode 22 at the substrate side is a low index layer of index $n_b$ or of another refractive index smaller than $n_e$. The leaky mode 22 excited by refraction of the wave 20 incident from the light sink 165 is totally reflected by mirror 12 in the form of a low index layer exhibiting total internal reflection, the thickness of the layer being preferably more than two times larger than the penetration of the evanescent field of the leaky mode in the said layer, and partially reflected by frustrated total internal reflection at the semi-reflective structure 13 in the form of a low index layer of thickness adjusted to provide sufficient field accumulation in layer 4 for cancelling the Fresnel reflection of wave 20 on the leaky mode propagating layer 4. The dispersion equation of the used leaky mode has phase shift terms $\phi_c$ and $\phi_s$ given by the arc tangent terms of total internal reflection; this determines the thickness H of the leaky mode propagating layer 4; in case the low index layers of reflective structures 12 and 13 have the same low index $n_b$, $\phi_s = \phi_c = -2 \arctan(((n_e^2 - n_b^2)/(n_f^2 - n_e^2))^{1/2})$ for the TE polarization for instance (in the case of the TM polarization there is a factor $n_f^2/n_b^2$ in front of the square root). Below the thick low index layer of structure 12 is a mirror 166 whose role is to reflect the $-1^{st}$ order diffracted towards the substrate. Mirror 166 is metallic if the technology allows it which has a practically non-limited angular range for reflecting efficiently all diffracted beams directed to the focus by the variable period diffractive element 8. If the technology imposes it, mirror 166 can also be a dielectric or semiconductor multilayer mirror of adequate angular width. An antireflection coating 167 is deposited onto the upper face of the device to enhance the extraction efficiency. The diffractive optical element 8 can have its grooves defined at any or both interfaces of layer 4, or it can also be first defined in the mirror 166 or in its substrate.

The present embodiment is not limited to semiconductor materials. It can for instance be implemented by means of organic materials. The light source 162 does not have to be integrated, it can also be hybridised by known means such as soldering.

The present embodiment can be used as a pick up device by reversing the propagation direction of all waves.

The 21$^{st}$ applicative embodiment concerns the domain of light extraction from light emitting systems where the light is emitted from a luminescent material in a planar layered form where part of the generated light remains trapped in the light emitting layers by total internal reflection at the interface between the light emitting layer and the external medium of lower refractive index whereto light extraction is desired (usually air) and gets finally absorbed. The light emission mechanisms can be electron-hole recombination as in Light Emitting Diodes (LEDs) where the emitting material is an organic or non-organic semiconductor, or optically excited fluorescence as in rare earth doped host materials in a layered form. It can be chemoluminescence and excited phosphors in a layer form. It can be light generation under efficiently excited nonlinear effects such as the Raman effect in films. Light extraction of trapped photons is usually enhanced by modifying the interface between the light emitting layer (or set of layers) and the medium whereto the light must be extracted (usually air or a transparent substrate such as a glass plate). Surface roughening can be used as in document T. Fujii, Y. Gao, R. Sharma, E. L. Hu, S. P. DenBaars, S, Nakamura, "Increase in the extraction efficiency of GaN-based light-emitting diodes via surface roughening, Appl. Phys. Lett, 84, 855-857 (2004). A surface corrugation, called coupling grating or photonic crystal, can also be used as in document Y. R. Do, Y. C. Kim, Y.-W. Song, C.-O Cho, H. Jeon, Y.-J. Lee, S.-H. Kim, Y.-H. Lee, "Enhanced light extraction from organic light-emitting diodes with 2 D $SiO_2/SiN_x$ Photonic crystals", Adv. Mater., 15, pp. 1214-1218. These solutions require a strong surface perturbation of the surface which may lead to electrical problems at the extraction side of the emitting layer. Light extraction can also be enhanced by depositing a very thin low loss metal film at the undulated interface between the light emitting layer and the external medium as described for instance in document L. H. Smith, J. A. E. Wasey, W. L. Barnes, "The light out-coupling efficiency of top emitting organic light-emitting diodes", Appl. Phys. Lett., 84, 2986-2988 (2004); this solution has limitations since it resorts to the excitation of the long range surface plasmon by the grating implying that a narrow spectral range and a not too wide angular spectrum do satisfy the coupling synchronism condition, all other trapped beams remaining trapped by metallic reflection; also a low loss metal film must be used such as pure silver or gold which makes the adhesion to other layers technologically difficult.

Figure 25:
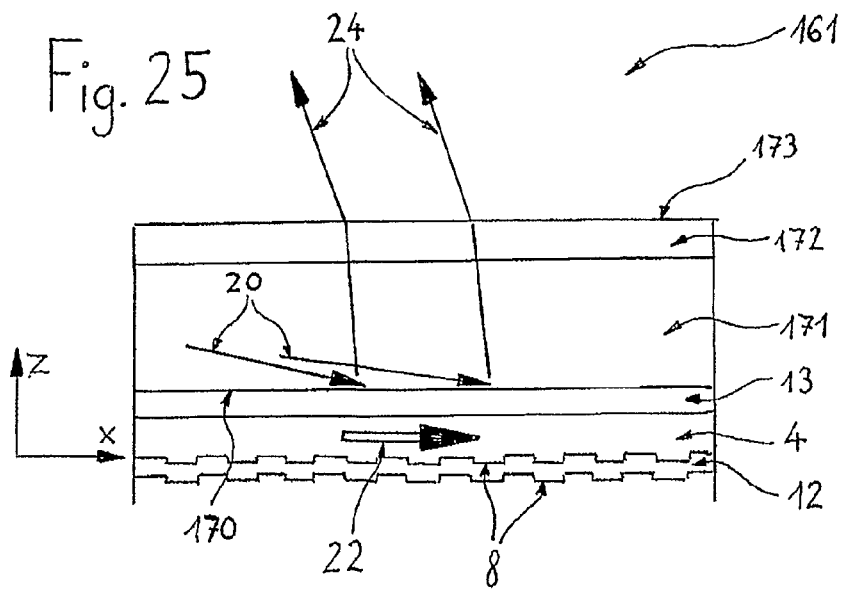
FIG. 25 is the cross-sectional view of a $21^{st}$ applicative embodiment of the device of the invention to light extraction from a light emitting device

This applicative embodiment is illustrated in FIG. 25; it is arranged at the side 170 of the light emitting layer (or set of layers) 171 opposite the outer medium 161 whereto the light is to be extracted in the form of beam 24. It is therefore not envisaged as a complete alternative to existing light extraction solutions, it can be used in combination with another known solution. It comprises a number of layers, all parallel to the general plane, a basis mirror 12, preferably a metal film as in the case of OLEDs or a multilayer mirror as in non-organic LEDs or rare earth doped layered oxides, a leaky mode propagating dielectric layer 4 between the light emitting layer 171 and the mirror 12, a possible semi-reflective structure 13 on top of the leaky mode propagating layer 4, and a corrugated or index modulated diffractive element 8, preferably a periodic grating. If mirror 12 is a metal film the mirror can also be one of the electrodes of an electrically excited light emitting source, for instance the cathode of an OLED. Layer 172 is a transparent electrode made of ITO for instance. The metal of mirror 12 must not necessarily be an ultra-low loss metal because the wave which stores the emitted trapped field is not a surface wave of the metal, like in the plasmon case; it is a leaky mode 22 of the dielectric layer 4 with relatively small field concentration, therefore low absorption loss. The leaky mode propagating layer 4 is a high refractive index transparent film of refractive index larger than that of the light emitting layer 171 so that the trapped emitted light waves 20 which propagate essentially along the plane of the structure under an angle larger than the critical angle between the light emitting layer 171 and the extraction medium 161, can excite leaky modes by refraction. Layer 171 acts as the cover medium 15 of the invention. Layer 4 is preferably made of a low optical loss conductive transparent material in the case of an electroluminescent light generation mechanism; it can be a sandwich of sublayers of different nature, for instance organic and non-organic. The thickness of the leaky mode propagating layer 4 is arranged to essentially satisfy the leaky mode dispersion equation for the spectral range emitted by the light emitting material, or desired from the latter, and for the trapped waves emitted within a definite angular range. The angular and spectral tolerances on the phase matching condition expressed by the dispersion equation can be made large for allowing the efficient extraction of a large optical spectrum and of a large part of the trapped angular spectrum. First it is an intrinsic property of the devices disclosed by document U.S. Pat. No. 6,219,478 to be highly tolerant on the incidence angle of the incident trapped waves 20, especially for grazing angles; furthermore, it is also a specific property of the disclosed devices to exhibit close to 100% diffraction efficiency under grazing angles. In addition to these intrinsic properties, the angular and spectral range of high extraction efficiency can be broadened either by using a metallic mirror 12 such as gold, silver, copper or even aluminium, or by designing the multilayer basis mirror 12 and the possible semi-reflective structure 13 so that they are broadband. Another possibility to broaden the angular and wavelength spectra is to use a rather deep grating 8 and/or a leaky mode propagating layer 4 of index not much larger than the index of the light emitting layer(s) 171. Another possibility of broadening the angular and wavelength spectra is to give the leaky mode propagating layer 4 a small amplitude waviness, the average period of the waviness being larger than approximately five times the propagation distance of the used leaky mode 22 (the propagation distance of a leaky mode is defined as $1/\alpha$, $\alpha$ being the leakage rate of the leaky mode into layer 171 in the absence of the grating); the effect of the waviness is to satisfy the leaky mode dispersion equation for broader angular and spectral ranges. The waves emitted and trapped in the light emitting layer 171 have a spatial frequency k-vector of arbitrary in-plane direction in the plane of the device and arbitrary polarization. If the leaky mode propagating layer 4 is of uniform thickness, essentially all emitted waves having the same in-plane k-vector projection, $k_h=2\pi/\lambda \sin\theta_c$, are coupled into the same leaky mode of layer 4 ($\lambda$ is the vacuum wavelength of the emitted wave, $\theta_c$ is its incidence angle in the light emitting layer defined relative to the normal), the in-plane direction of the leaky mode 22 being arbitrary. Diffracting this leaky mode propagating in all in-plane directions at a diffraction angle $\theta_d$ smaller than the critical angle $\theta_{cr}$ between layer 171 and cover medium 161 requires a grating 8 whose $K_g$-vector has more than a single in-plane direction; this can be made by segmenting the grating plane into a number of zones each having a 1 D grating of different direction; the diffraction is mainly outside the plane of incidence. Diffracting all incident waves essentially normally to the structure plane can also be made by using a 2 D grating made of crossed lines. The k-vector normal projections $k_n$ also represent a continuum, i.e., the emitted waves 20 are of arbitrary direction in planes normal to the general plane between grazing incidence and the critical angle $\theta_{cr}$ if the distance between the basis mirror 12 and the totally reflecting interface 173 is large, for instance more than 10 wavelengths, whereas, if this distance is a few wavelengths, for instance 2 wavelengths, the angles in the normal planes are discretised since they correspond to the finite set of propagating modes of the trapping layer(s) 171. This may lead to spikes and lines in the extracted spectrum. A possibility to angularly and spectrally homogenize the extracted light in the case of discretised angles is to vary the grating period across the device area at a rate which is spatially not faster than the inverse of the propagation distance of the used leaky mode 22.

A semi-reflecting structure 13 can be used on top of the leaky mode propagating layer 4 for the following objectives: by adjusting its reflection coefficient seen from the leaky mode propagating layer 4 it is possible to match the diffracted spectrum with the emitted spectrum of the light emitting material or to match it with a desired extracted spectrum. In cases where the light emitting material is of high index, and where it is not possible to create a leaky mode propagating layer of higher index, the semi-reflective structure 13 is used to confine the leaky mode. In cases where active layer 171 is of high refractive index and layer 4 is also of high refractive index, semi-reflective structure 13 can use frustrated total internal reflection. Semi-reflective structure 13 can also be used to render the leaky mode dispersion equation of the TE and TM polarization essentially identical which represents the big advantage of extracting both polarization for the same spectral component and incidence angle. It must however be noted that in the case of broad band emission and large angular range, the dispersion equation can be satisfied for more than one TE and TM modes if the leaky mode propagating layer is sufficiently thick; if in addition the leaky mode resonances are broad, the diffraction efficiency peaks corresponding to adjacent leaky modes tend to partially overlap.

Grating 8 is a corrugation of the interface between the leaky mode propagating layer 4 and the light emitting layer(s) 171. However, a number of different schemes are possible depending on the type of light emitting material, of layered structure, and of manufacturing technology; for instance, the substrate of mirror 12 is first corrugated, the interfaces between layers 12, 4, 13 and 171 being consequently also corrugated; or the mirror 12 is flat and the leaky mode propagating layer 4 is a segmented high index film with direct electrical contact in each or some of the grating grooves between mirror 12 and layer 171 or between mirror 12 and a conductive layer. The choice between the possible grating structures depends of the light generation mechanism, means being provided to allow for electron and hole transport through layer 4 and structure 13 in electrically excited light generation devices.

In a variation of the present embodiment where luminescence is excited optically, grating 8 is also used to trap the excitation wave into the light emitting layer 171 according to the law of the inverse light path; this function is described in more details in the $22^{nd}$ applicative embodiment.

A $22^{nd}$ applicative embodiment is illustrated in FIG. 26. It concerns the efficient pumping of light emitting systems whose active medium is in the form of a slab characterized by an aspect ratio such that the slab thickness is smaller than the in-plane slab dimensions or diameter. The best known lasers having this planar configuration of the active medium are microchip lasers and disk lasers as disclosed for instance in document U.S. Pat. No. 5,553,088. The thickness of the active slab of a disk laser for instance is typically a few hundreds of micrometers whereas its physical lateral dimensions are a few millimeters; however, the lateral dimension can be much larger as in high energy light generation or amplification applications. Such slab systems can be pumped from the side after edge preparation. They are usually pumped coaxially like in microchip lasers as disclosed by document U.S. Pat. No. 6,049,558. They can also be pumped according to a multi-path pump beam scheme as in disk lasers, when the active disk is too thin to exhibit sufficient absorption upon a single or double path, by means of a multiple mirror system installed above and/or under the active slab.

Another pumping scheme is disclosed here on the basis of document U.S. Pat. No. 6,219,478. It is the high efficiency distributed reflective grating coupling of a pump beam 180 into the slab 181 of active material parallel to the general plane. The pump beam 180 has a small angular aperture of the order of 1 degree and a wavelength line width of a few nanometers; it is emitted for instance by a high power wide stripe semiconductor laser, or a 1 D or 2 D array of laser diodes, or by any light source delivering a beam of comparable or smaller aperture and line width; it is preferably linearly polarized. The pump beam 180 impinges onto the active slab 181 from the side of the external medium 161; the incidence angle in the external medium (usually air) can range between zero and a large angle with an antireflection coating 182 between slab 181 and cover 161. The pump beam 180 is coupled at the corrugated bottom side 183 of the active slab 181 to trapped wave 187 under a diffracted angle $\theta_d$ in the slab larger than the critical angle at the slab/external medium interface by means of grating 8.

It is to be noted that in the present applicative embodiment diffractive structure 8 is preferably located between the active slab 181 representing cover medium 15, and layer 189 representing semi-reflective structure 13.

The trapped wave propagates in zigzags by total reflection at the upper slab side 184. The diffraction angle $\theta_d$ is preferably large, for instance larger than 70 degrees, to permit the essentially complete absorption of the pump upon one period of the zigzag of trapped beam 187 in the slab 181, before a second diffraction event would extract the remaining non-absorbed pump power into the external medium 161. The coupling device 185 of the invention can pump a laser; in this case, the pump incidence is preferably oblique since the laser cavity mirrors are preferably parallel to, and possibly integrated to the active slab 181; however, V-shape laser cavities are known which permit essentially normal pumping. The known advantage of a thin planar active slab laser/amplifier is easier cooling; therefore the amplification scheme is preferably reflective, the coupling device 185 being preferably a high reflectivity mirror for the emitted or amplified wave 186. In low power applications, the part of the diffractive structure reflecting the amplified wave 186 can be metallic whereas in high power applications it must be a dielectric multilayer mirror, or the complete corrugated multilayer must also reflect the amplified wave 186 totally.

Some of the advantages of high, possibly up to 100% efficiency light trapping in the active slab are:

The almost complete absorption of the pump is single path even if the active slab is very thin provided the choice of the thickness and of the diffraction angle $\theta_d$ leads to the desired pump absorption over one zigzag of trapped beam 187 in slab 181. Coupling grating 8 covers uniformly the whole area of the active slab. However, if the pump is in the form of an array of $N_p$ separated pump lasers or laser arrays, grating 8 can consist of $N_p$ separated grating zones with gratingless areas between grating zones with the advantage that trapped beam 187 can propagate more than one zigzag without being coupled out.

The coupling device disclosed by document U.S. Pat. No. 6,219,478 gives rise to possibly 100% diffraction efficiency even under grazing incidence which permits to lengthen the zigzag period in slab 181, therefore to decrease the active slab thickness.

The coupling grating technology is planar, therefore compatible with the planar fabrication steps of the complete active slab 181.

The coupling device is scalable from the small emission area of a microchip laser to the very large surface of a thin, high power amplifier.

One of the preferred embodiments is described hereafter. It is an ytterbium (Yb) doped YAG slab 181 emitting at $\lambda_s$=1030 nm wavelength when pumped at $\lambda_p$=940 nm wavelength. The host material of slab 181 can be single YAG crystal or, for large area amplification for instance, a YAG ceramic material.

The aim of the grating coupling device 185 is to couple the pump beam 180 of preferably TE polarization (the electric field of the polarized pump beam is parallel to the grating lines) to a trapped wave 187 with high, possibly 100% efficiency into the active slab 181 under a large diffraction angle $\theta_d$. In the presently described embodiment $\theta_i$=30 degrees in the external medium 161 and the diffraction angle $\theta_d$=70 degrees in the doped YAG slab 181 of refractive index $n_s$=1.813, with a grating period $\Lambda$=426 nm. Document U.S. Pat. No. 6,219,478 teaches that this problem is the reciprocal problem of the problem which said document explicitely solves: the present problem is the wave trapping into the active slab 181 whereas the cited document explicitely describes the inverse optical path problem: high, possibly 100% efficiency extraction of an incident beam 20 under 70 degrees in the YAG slab 181 by the $-1^{st}$ order diffraction of the grating 8 to extract beam 24 in another direction significantly closer to the normal (16 degrees in the slab 30 and 30 degrees in the air cover).

The inverse optical path problem is solved as follows. The active slab 181 is considered as the cover medium 15 of the invention where beam 20 is the incident beam, and $\theta_d$ is now the incidence angle $\theta_c$. The grating coupling device 185 is composed of 4 parts, possibly 5 parts. The first part is a high index leaky mode propagating layer 4. The second part is a total internal reflection mirror 12 for the incident beam 20 (i.e., the trapped beam 187 in the direct path problem) represented by the thick low index layer 188 of approximately 631 nm thickness; the beam 20 incident from the YAG slab 181 under 70 degrees is totally reflected by layer 188 if layer 188 is thick enough to prevent any frustrated total reflection into higher index layers underneath. The third part is a semi-reflective layer 13 for the leaky mode (the reflection mechanism is frustrated total internal reflection), represented by a low index layer 189 inserted between the active slab 181 and the leaky mode propagating layer 4; the refractive index difference between YAG slab 181 and the high layer index leaky mode propagating layer 4 is too small to lead to an easy cancellation of the zero$^{th}$ reflected order if the active slab 181 and layer 4 were in direct contact, therefore a leaky mode field enhancement is necessary which is produced by using a low index buffer layer 189 of 328 nm approximately as the semi-reflective structure 13. The dispersion equation of the leaky mode in the present case uses the total reflection phaseshifts reminded in the present 20$^{th}$ embodiment. It determines after some optimisation a thickness for layer 4 of approximately 136 nm. The fourth part of the structure is the multilayer mirror 190 for the complete reflection of the $-1^{st}$ order diffracted downwards, composed of 17 alternate layers of quarter wave thickness at wavelength $\lambda_p$ of 112 nm and 171 nm approximately; the multilayer mirror 190 is all composed of deposited layers of low ($n_l$=1.46) and high ($n_h$=2.15) refractive index (any other pair of index can be considered). A possible 5$^{th}$ part of the structure is the mirror 191 reflecting the lasing or amplified wave 186 at $\lambda_s$=1030 nm. In the present case, normal incidence and reflection of the amplified wave 186 requires a reflection multilayer of layer thicknesses close to those for the reflection of the pump wave 180; consequently the same multilayer 190 ensures here the complete reflection of both the amplified 186 and the pump 180 waves. The presence of grating 8 of suitably short period does not give rise to propagating diffraction orders at the lasing or amplified wavelength $\lambda_s$, therefore the latter does not suffer losses. The grating 8 is first etched in the active slab 181 (it can also be etched in a first thin layer of low or high index first deposited onto the active slab if more easily fabricable). The grating depth is approximately 35 nm if the grating profile is sinusoidal, and approximately 27.5 nm if the groove profile is rectangular; the grating being first fabricated at the basis of the multilayer at the bottom side 183 of the active slab 181, the surface undulation reproduces more or less conformally at all multilayer interfaces depending on the deposition technology (electron beam evaporation smoothes the corrugation whereas ion plating essentially preserves the corrugation profile at all interfaces).

After the above described design has been made for the inverse optical path problem, the same structure is used with a beam 180 propagating in the opposite direction, incident from the external medium 161, trapped in the form of beam 187 in slab 181, as illustrated in FIG. 26, which corresponds to the operation mode of the pump trapping device of the invention. The same maximum efficiency of close to 100% is found. At this stage, an optimisation of the parameters of the structure (essentially the thickness of layers 4, 188 and 189 as well as the grating depth) takes place to give the desired angular and spectral tolerances dictated by the pump beam and the pump source as well as by the available pump beam shaping elements. Care is taken that grating 8 does not excite guided modes at and in the close neighbourhood of wavelength $\lambda_p$ of the multilayer 190 and/or 191. The parameters of an optimised structure are given hereafter as an example with a wavelength tolerance of 1 nm around 940 nm, and of 1 degree around the incidence angle of 30 degrees in air, the pump beam 180 having a TE polarization, i.e., the pump beam electric field is parallel to the grating lines. The grating period is 426 nm and grating depth 122 nm assuming a binary grating 8 with rectangular grooves made in the bottom surface of slab 181. Layers 189, 4 and 188 have a thickness of 170 nm, 135.5 nm and 613 nm respectively, the multilayer mirror 187 being composed of the same 17 layers as above.

In a further embodiment, grating 8 is a 2 D grating with two set of rectilinear grooves crossing, for instance, orthogonally and having the same period $\Lambda$. A first pump beam 180 impinges onto the grating within an incidence plane containing the $K_g$-vector of one set of grooves, a second pump beam impinges on the same grating with the same incidence angle within an incidence plane orthogonal to the latter and containing the $K_g$-vector of the orthogonal set of grooves. The amplified or lasing wave 186 is still considered in the present example as impinging normally to the general plane. The condition for wave 186 not to suffer diffraction losses from the diagonal $K_g$-vector of modulus $1.414\pi/\Lambda$ of the chessboard grating is $\sin \theta_i > n_c(1.414 \lambda_p/\lambda_s - 1)$ This implies that the grating period $\Lambda$ is limited by $\lambda_p/(n_c + \sin \theta_i) < \Lambda < 0.707 \lambda_s/n_c$. In the above example of an ytterbium doped active slab 181, $\theta_i$ is larger than essentially 32 degrees.

In a further embodiment which will not be described, the pump beam 180 is essentially normal to the slab plane whereas the lasing or amplified wave 186 is under an angle in a incidence plane orthogonal to that of the pump; the grating is "seen" by the amplified wave 186 in a conical configuration which makes it easier to forbid the propagation of diffraction orders at the amplified wavelength. The 5$^{th}$ part of the structure is here necessary: a multilayer mirror 191 made of quarter wave layers for reflecting the amplified wave 186 is deposited on top of the four previous parts.

In another embodiment the lasing or amplified wave 186 is not reflected by the grating coupling device 185, but it is transmitted with essentially zero loss through the device 185. The incidence angle, the incidence plane, the polarization, and layers 4, 188, 189, 190 are arranged to provide close to 100% transmission for the lasing or amplified wave 186.

The distributed diffractive pump trapping device described here is not limited to rare-earth doped or co-doped oxide or fluoride slabs. It concerns all light generating material systems which are pumped optically such as semiconductors, dye-doped or rare-earth doped polymers or amorphous ceramic and crystalline structure. The concerned light emitting systems are not limited to lasers, they can be amplifiers and any optically excited system in a planar slab configuration which uses optical excitation for optical emission or optical processing. The wavelength range is not limited to the near infrared range; it extends to all wavelength domains where light absorption leads to stimulated emission.

The present embodiment also encompasses cases where the luminescence excitation beam 180 provokes spontaneous emission in active layer 181, where the amplified beam 186 is absent and where grating 8 traps the excitation beam 180 and also extracts the trapped luminescence according to the $21^{st}$ applicative embodiment described above.

All embodiments and application examples have been described with reference to the optical field. This does not represent a restriction of the applicability of the device of the invention to other frequency domains of the electromagnetic spectrum. Those familiar with the art in far infrared, deep ultraviolet, millimeter waves, terahertz waves and microwaves will easily adapt the described embodiments to the materials and technologies pertaining to each of these spectral domains.

All embodiments of the present invention have been made with reference to planar substrates. This does not represent a limitation to planar surfaces. Those familiar with the art will easily adapt the described embodiments to curved surfaces.

The invention claimed is:

1. An optical diffraction device comprising:
a layer defining a general plane and arranged for propagating locally at least one local leaky mode which is excited by refraction of a locally incident electromagnetic wave having a given vacuum wavelength $\lambda$ and reaching said layer from a cover medium of refractive index $n_c$ under a local incidence angle $\theta_c$ relative to the normal to said general plane, said layer having a local mean thickness H and a local refractive index profile $n_f$ substantially satisfying the resonance condition for said at least one local leaky mode;
a highly reflective structure at the lower side of said layer for said at least one local leaky mode;
a diffractive element in the form of a corrugation or/and of an index modulation arranged in, or/and at the upper side of, or/and above, or/and at the lower side of, or/and under said layer for diffracting said locally incident electromagnetic wave into the reflected $-1^{st}$ order in a direction non-parallel to the direction of this locally incident electromagnetic wave;
said locally incident electromagnetic wave reaching said layer with a local incidence direction defining together with said normal to the general plane a local incidence plane, said diffractive element having a local grating vector $K_g$ making an angle β with said local incidence plane which is larger than or equal to zero and smaller than or equal to 90 degrees, the diffractive element having, where said locally incident electromagnetic wave reaches said layer, no positive propagating diffraction order and all negative propagating orders with substantially zero diffraction efficiency except the $-1^{st}$ order when said angle β is smaller than 90 degrees and all propagating diffraction orders except the two first diffraction orders with substantially zero diffraction efficiency when said angle β is equal to 90 degrees, wherein the diffraction device comprises a semi-reflective structure for said locally incident electromagnetic wave which is arranged between the upper side of said layer and said cover medium, this semi-reflective structure being arranged for increasing the $-1^{st}$ order diffraction efficiency when said angle β is smaller than 90 degrees and the two first diffraction order efficiencies when said angle β is equal to 90 degrees.

2. A device according to claim 1 wherein said layer has a local refractive index $n_f$ and a local mean thickness H substantially satisfying the leaky mode dispersion equation $$kH(n_f^2 - n_c^2 \cos^2 \alpha)^{1/2} = m_{lm}\pi - \phi/2 - \phi_c/2,$$

where $k=2\pi/\lambda$, $m_{lm}$ is an integer number larger or equal to zero, $\alpha = \pi/2 - \phi_c$, $\phi$ and $\phi_c$ are the reflection phase shifts at the lower side and at the upper side of said layer.

3. The device according to claim 1 wherein said index profile $n_f$ of said layer is continuous or/and varies by index steps.

4. The device according to claim 1 wherein the sole propagating negative diffraction order in at least a region of said diffractive element is the $-1^{st}$ order.

5. The device according to claim 4 wherein at least a region of said diffractive element is formed by a grating of substantially sinusoidal profile and small amplitude, or of substantially sinusoidal index modulation with a small amplitude.

6. The device according to claim 4 wherein the refractive index of the cover medium is larger than the refractive index of said layer and where the angle of incidence $\theta_c$ of said electromagnetic wave is smaller than $\arcsin(n_f/n_c)$.

7. The device according to claim 1 wherein at least a region of said diffractive element is formed by a grating of substantially sinusoidal profile and small amplitude, or of substantially sinusoidal index modulation with a small amplitude.

8. The device according to claim 7 wherein said diffraction grating is created by a surface acoustic wave generated by a transducer.

9. The device according to claim 7 wherein said diffractive element is generated by an electrically actuated viscoelastic material.

10. The device according to claim 1 wherein the reflective structure is a resonant waveguide grating.

11. The device according to claim 1 wherein the semi-reflective structure is a resonant waveguide grating.

12. The device according to claim 1 wherein said semi-reflective structure is formed by a single high refractive index layer.

13. The device according to claim 1 wherein said semi-reflective structure is formed by a multilayer.

14. The device according to claim 13 wherein said semi-reflective structure is formed by a resonance broadening chirped multilayer.

15. The device according to claim 1 wherein said semi-reflective structure comprises a transparent electrode.

16. The device according to claim 1 wherein said semi-reflective structure is formed by a low index trench.

17. The device according to claim 1 wherein said semi-reflective structure is formed by a thin metallic film.

18. The device according to claim 1 wherein the reflective structure between said layer and said substrate is a total internal reflector for said at least one local leaky mode and/or for the transmitted $-1^{st}$ diffraction order in said layer.

19. The device according to claim 1 wherein the difference between the reflection phase shift sum $\phi + \phi_c$ of TE and TM polarizations is an integer multiple of $2\pi$, $\phi$ and $\phi_c$ being the reflection phase shifts at the lower side and at the upper side of said layer.

20. The device according to claim 1 wherein said semi-reflective structure or said reflective structure is formed by two phase shifted corrugations.

21. The device according to claim 1 wherein the thickness of said layer has spatial variations in said general plane.

22. The device according to claim 1 wherein the transmitted $-1^{st}$ diffracted order in said layer corresponds to a leaky mode of this layer of order and/or of polarization differing from said leaky mode.

23. The device according to claim 1 performing as a high visibility hologram comprising a polymer cover medium, a high index leaky mode field enhancement semi-reflective structure, said layer, a metal mirror and a diffractive element embossed at the surface of substrate.

24. The device according to claim 1 performing as a notch filter filtering out diffracted waves and wherein the cover medium has a refractive index larger than the one of the substrate and incident wave experiences total internal reflection at the interface between layer and substrate.

25. The device according to claim 1 performing as a dispersion compensator and comprising two opposite optical diffraction elements.

26. The device according to claim 1 performing as an external mirror rendering a wide stripe semiconductor laser single transverse mode and comprising a substrate with two oblique side mirrors, said mirror, said layer and said semi-reflective structure being normal to the wide stripe laser axis.

27. The device according to claim 1 performing as a lighting window or back illumination panel comprising a finite thickness cover medium and a mirror, wherein the incident wave propagates in zigzags in this cover medium and is diffracted out of said cover medium, the average thickness H of said layer propagating at least one leaky mode at the spectral components composing the diffracted wave.

28. The device according to claim 1 performing as a high efficiency diffractive element in a monolithic optical interconnect wherein the incident beam propagates in zigzags in the cover medium having a finite thickness, the diffractive optical element associated with said layer being placed at any side of the said finite thickness cover medium.

29. The device according to claim 1 performing as a high efficiency input and output port of an optical back-plane wherein incident waves propagating in a thick waveguide on a substrate reach output/input port comprising a mirror, a leaky mode propagating layer and a grating diffracting a beam essentially normally to its general plane.

30. The device according to claim 1 performing as an electro-optic frequency sweeper in a Littman-Metcalf mounting comprising a lens and a spatial light modulator.

31. The device according to claim 1 performing as a displacement sensor and comprising a grating rule with sinusoidal grating profile, a leaky mode propagating layer, a mirror and a swapping grating element with sinusoidal grating profile, a leaky mode propagating layer and a mirror.

32. The device according to claim 1 performing as a high efficiency dynamic hologram wherein said layer is composed of a light activated photochromic or photorefractive material.

33. The device according to claim 1 wherein said layer is composed of a liquid crystal or polymer dispersed liquid crystal actuated by a metal electrode and a transparent electrode.

34. The device according to claim 1 wherein said diffraction grating is created by a surface acoustic wave generated by a transducer.

35. The device according to claim 1 wherein the sole propagating negative diffraction orders in at least a region of said diffractive element are the $-1^{st}$ and $-2^{nd}$ orders, the $-2^{nd}$ order having a diffraction efficiency substantially equal to zero.

36. The device according to claim 35 wherein the diffractive element in said at least a region is a binary grating made of substantially rectangular grooves of substantially 50/50 line/space ratio and relatively shallow depth.

37. The device according to claim 1 wherein said diffractive element is generated by an electrically actuated viscoelastic material.

38. The device according to claim 1 performing as a disk pickup head wherein said diffractive element defines a focusing grating.

39. The device according to claim 1 performing light extraction from a light emitting layer into an external medium, said light emitting layer defining said cover medium and being arranged between this device and said external medium.

40. The device according to claim 1 performing from an external medium pump light trapping into a lasing or amplifying layer, said lasing or amplifying layer defining said cover medium and being arranged between this device and said external medium.

41. The device according to claim 1 performing as a high efficiency axicon in reflection wherein said diffractive element is a grating of non intersecting closed grating lines and is arranged so that an essentially collimated incident beam experiences conical diffraction.

* * * * *